US008527414B2

(12) United States Patent
Ross et al.

(10) Patent No.: US 8,527,414 B2
(45) Date of Patent: Sep. 3, 2013

(54) OFFSETTING FUTURE ACCOUNT DISCREPANCY ASSESSMENTS

(75) Inventors: Erik Stephen Ross, Charlotte, NC (US); Tamara S. Kingston, Peoria, AZ (US); John Franklin Tuders, Harrisburg, NC (US); John Harden Quintiliani, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/006,641

(22) Filed: Jan. 14, 2011

(65) Prior Publication Data

US 2012/0185389 A1    Jul. 19, 2012
US 2012/0330831 A2    Dec. 27, 2012

(51) Int. Cl.
*G06Q 40/00*    (2012.01)

(52) U.S. Cl.
USPC ............................................... 705/42; 705/35

(58) Field of Classification Search
USPC ..................................................... 705/42, 35
See application file for complete search history.

(56) References Cited

U.S. PATENT DOCUMENTS

| 8,061,592 B1 * | 11/2011 | Clem et al. ..................... 235/379 |
| 2007/0263812 A1 * | 11/2007 | Polozola et al. .......... 379/144.02 |
| 2010/0076873 A1 * | 3/2010 | Taylor et al. .................... 705/30 |
| 2010/0161487 A1 * | 6/2010 | Patel et al. ....................... 705/43 |

OTHER PUBLICATIONS

Chinloy, Peter; Winkler, Daniel T; "Contract Incentives and Effort"; Oct.-Dec. 2010; Journal of Real Estate Research; ISSN: 0896-5803.*
Hartley, Darin E. "E-Valuation: Pricing E-Learning"; Training & Development; Apr. 2001; ISSN: 1055-9760.*
The_Virginian_Pilot; "It never hurts to question charges on credit card bill."; Nov. 22, 2009; ISSN: 0889-6127.*

* cited by examiner

*Primary Examiner* — Edward Chang
(74) *Attorney, Agent, or Firm* — Michael A. Springs; Moore & Van Allen PLLC; Tracea L. Rice

(57) ABSTRACT

In general terms, embodiments of the present invention relate to methods and apparatuses for prepaying, covering, avoiding, negating, and/or otherwise offsetting future account discrepancy assessments. For example, in some embodiments, a method is provided that includes: (a) receiving one or more payments for offsetting one or more future account discrepancy assessments, where the one or more payments are associated with an account; (b) receiving transaction information associated with a transaction, where the transaction involves the account, and where the transaction is initiated after the receiving the one or more payments; (c) determining, based at least partially on the transaction information, that the account will incur an account discrepancy as a result of the transaction; (d) determining that the one or more payments are sufficient to offset an account discrepancy assessment associated with the account discrepancy; and (e) authorizing the transaction based at least partially on the determining that the one or more payments are sufficient.

34 Claims, 6 Drawing Sheets

OFFSETTING FUTURE ACCOUNT DISCREPANCY ASSESSMENTS

BACKGROUND

Financial institution customers are constantly looking for new and useful ways to manage their finances. This is particularly so given that most customers have multiple financial accounts and the consequences of neglecting any one of them, even once, can result in assessments, added interest, lower credit scores, public embarrassment, and/or other negative outcomes. Accordingly, there is a need to provide methods and apparatuses that help these customers better manage their finances.

SUMMARY OF SELECTED EMBODIMENTS OF THE PRESENT INVENTION

In general terms, embodiments of the present invention relate to methods and apparatuses for prepaying, covering, avoiding, negating, and/or otherwise offsetting future account discrepancy assessments. As an example, in some embodiments, an account holder can prepay one or more future account discrepancy assessments, so that if the account holder later engages in a transaction that results in an account discrepancy assessment, that account discrepancy assessment will be paid, covered, avoided, and/or otherwise offset. In other words, the account holder can offset an account discrepancy assessment before a transaction that results in that account discrepancy assessment is ever initiated.

In some cases, the account holder may have a financial incentive to prepay and/or otherwise offset future account discrepancy assessments. For example, in some embodiments, a regular account discrepancy assessment is $35 if paid after and/or at the time the account discrepancy assessment is incurred, but the account discrepancy assessment may be only $10 if paid in advance (i.e., paid before the holder engages in the transaction that results in the account discrepancy assessment). There may also be other incentives for prepaying, covering, and/or otherwise offsetting future account discrepancy assessments. For example, in some embodiments, when an account holder prepays one or more future account discrepancy assessments, the account holder also consents to later incurring and/or offsetting those one or more future account discrepancy assessments. As a result, the holder may not be required to provide this consent later (e.g., at the time of the account discrepancy transaction, etc.), which may spare the holder of any public embarrassment, annoyance, and/or hassle associated with providing the consent and/or being notified of the account discrepancy and/or account discrepancy assessment.

As described in more detail herein, some embodiments of the present invention provide a method that includes: (a) receiving one or more payments for offsetting one or more future account discrepancy assessments, where the one or more payments are associated with an account; (b) receiving transaction information associated with a transaction, where the transaction involves the account, and where the transaction is initiated after the receiving the one or more payments; (c) determining, based at least partially on the transaction information, that the account will incur an account discrepancy as a result of the transaction; (d) determining that the one or more payments are sufficient to offset an account discrepancy assessment associated with the account discrepancy; and (e) authorizing the transaction based at least partially on the determining that the one or more payments are sufficient.

In some embodiments, the method further includes increasing an account discrepancy allocation associated with the account based at least partially on the receiving the one or more payments. In some of these embodiments, the determining that the one or more payments are sufficient includes determining that the account discrepancy allocation is sufficient to offset the account discrepancy assessment. In addition, in some embodiments, the authorizing the transaction includes authorizing the transaction based at least partially on the determining that the account discrepancy allocation is sufficient. In some embodiments, the determining that the account discrepancy allocation is sufficient to offset the account discrepancy assessment includes determining that the amount of the account discrepancy assessment is less than the amount of the account discrepancy allocation.

In some embodiments, the method further includes decreasing the account discrepancy allocation based at least partially on the authorizing the transaction. Also, in some embodiments, the account discrepancy allocation has a balance, and the increasing the account discrepancy allocation includes increasing the balance by at least the amount of the one or more payments. In some of these embodiments, the decreasing the account discrepancy allocation includes decreasing the balance by the amount of the account discrepancy assessment. However, in other embodiments, the account discrepancy allocation includes a number of account discrepancy assessment credits, and the increasing the account discrepancy allocation includes increasing the number of account discrepancy assessment credits. In some of these embodiments, the decreasing the account discrepancy allocation includes decreasing the number of account discrepancy assessment credits. Further, in some embodiments, the determining that the account discrepancy allocation is sufficient to offset the account discrepancy assessment includes determining that the account discrepancy allocation has at least one account discrepancy assessment credit.

In some embodiments, the method further includes: (a) determining that the account discrepancy allocation has fallen below a predetermined threshold; and (b) prompting a holder of the account to increase the account discrepancy allocation based at least partially on the determining that the account discrepancy allocation has fallen below the predetermined threshold. Additionally or alternatively, in some embodiments, the method further includes: (a) receiving a transaction history associated with the account; (b) determining a trend based at least partially on the transaction history; and (c) prompting a holder of the account to submit one or more payments for offsetting one or more future account discrepancy assessments, where the prompting is based at least partially on the trend. In some embodiments, the receiving the one or more payments includes receiving, from a holder of the account, consent to the account being assessed the one or more future account discrepancies assessments, and where the authorizing the transaction includes authorizing the transaction based at least partially on the receiving the consent.

In some embodiments, the receiving the one or more payments for offsetting one or more future account discrepancy assessments includes receiving one or more premium payments for purchasing coverage to offset one or more future account discrepancy assessments. In some of these embodiments, the method further includes: recording coverage information in a computer-readable medium based at least partially on the receiving the one or more premium payments, where the coverage information indicates that the account has coverage to offset one or more future account discrepancy assessments. In some embodiments, the determining that the one or more payments are sufficient includes determining, based at least partially on the coverage information, that the account has coverage sufficient to offset the account discrepancy assessment. Additionally or alternatively, in some embodiments, the authorizing the transaction includes authorizing the transaction based at least partially on the determining that the account has coverage sufficient to offset the account discrepancy assessment.

In some embodiments, the coverage includes a predetermined coverage amount for offsetting one or more future account discrepancy assessments, and the determining that the account has coverage sufficient to offset the account discrepancy assessment includes determining that the amount of the account discrepancy assessment is less than the predetermined coverage amount. Additionally or alternatively, in some embodiments, the coverage includes a predetermined coverage period for offsetting one or more future account discrepancy assessments, and the determining that the account has coverage sufficient to offset the account discrepancy assessment includes determining that the transaction occurs during the predetermined coverage period. In some embodiments, the coverage is sufficient to offset a predetermined number of future account discrepancy assessments, and the determining that the account has coverage sufficient to offset the account discrepancy assessment includes determining that the account discrepancy assessment is within the predetermined number In some embodiments of the method, the receiving one or more payments for offsetting one or more future account discrepancy assessments includes receiving one or more payments for avoiding one or more future account discrepancy assessments. In some of these embodiments, the determining that the one or more payments are sufficient to offset the account discrepancy assessment includes determining that the one or more payments are sufficient to avoid the account discrepancy assessment. In addition, in some of these embodiments, the authorizing the transaction includes authorizing the transaction based at least partially on the determining that the one or more payments are sufficient to avoid the account discrepancy assessment.

However, in other embodiments of the method, the receiving one or more payments for offsetting one or more future account discrepancy assessments includes receiving one or more payments for prepaying one or more future account discrepancy assessments. In some of these embodiments, the determining that the one or more payments are sufficient to offset the account discrepancy assessment includes determining that the one or more payments are sufficient to pay the account discrepancy assessment. In addition, in some embodiments, the authorizing the transaction includes authorizing the transaction based at least partially on the determining that the one or more payments are sufficient to pay the account discrepancy assessment.

Also, in some embodiments of the method, the receiving the one or more payments includes receiving the one or more payments from a first transaction machine. In some of these embodiments, the transaction involves a second transaction machine, and the second transaction machine is different than the first transaction machine and located remotely from the first transaction machine. In some embodiments of the method, the transaction is initiated at least one hour after the receiving the one or more payments. Additionally or alternatively, in some embodiments of the method, the transaction involves a holder of the account. In some of these embodiments, the method further includes prompting the holder to consent to using the one or more payments to offset the account discrepancy assessment, where the prompting occurs after the determining that the account will incur the account discrepancy and before the authorizing the transaction.

As also described in more detail herein, other embodiments of the present invention provide an apparatus that includes a communication interface configured to: (a) receive one or more payments for offsetting one or more future account discrepancy assessments, where the one or more payments are associated with an account; and (b) receive transaction information associated with a transaction, where the transaction involves the account, and where the transaction is initiated after the communication interface receives the one or more payments. In some of these embodiments, the apparatus also includes a processor operatively connected to the communication interface and configured to: (a) determine, based at least partially on the transaction information, that the account will incur an account discrepancy as a result of the transaction; (b) determine that the one or more payments are sufficient to offset an account discrepancy assessment associated with the account discrepancy; and (c) authorize the transaction based at least partially on the processor determining that the one or more payments are sufficient.

Still other embodiments of the present invention provide a computer program product having a non-transitory computer-readable medium. In some of these embodiments, the non-transitory computer-readable medium includes one or more computer-executable program code portions that, when executed by a computer, cause the computer to: (a) receive one or more payments for offsetting one or more future account discrepancy assessments, where the one or more payments are associated with an account; (b) receive transaction information associated with a transaction, where the transaction involves the account, and where the transaction is initiated after the computer receives the one or more payments; (c) determine, based at least partially on the transaction information, that the account will incur an account discrepancy as a result of the transaction; (d) determine that the one or more payments are sufficient to offset an account discrepancy assessment associated with the account discrepancy; and (e) authorize the transaction based at least partially on the computer determining that the one or more payments are sufficient.

Other embodiments of the present invention provide a method that includes: (a) receiving a payment for prepaying a future account discrepancy assessment, where the payment is associated with an account; (b) increasing an account discrepancy allocation associated with the account based at least partially on the receiving the payment; (c) determining, using a processor, that the account has incurred an account discrepancy assessment as a result of a transaction, where the transaction was initiated after the receiving the payment; and (d) decreasing the account discrepancy allocation based at least partially on the determining that the account has incurred the account discrepancy assessment.

In some embodiments of this method, the increasing the account discrepancy allocation includes increasing the account discrepancy allocation by the amount of the payment. Additionally or alternatively, in some embodiments, the decreasing the account discrepancy allocation includes decreasing the account discrepancy allocation by the amount of the account discrepancy assessment. Also, in some embodiments of the method, the decreasing the account discrepancy allocation includes paying the account discrepancy assessment. In some embodiments, the method further includes: (a) receiving a transaction history associated with the account; (b) determining a trend based at least partially on the transaction history, where the trend is based at least partially on the number of account discrepancy assessments identified in the transaction history; and (c) prompting a holder of the account to increase the account discrepancy allocation based at least partially on the trend.

In some embodiments of the method, the transaction is completed before the determining that the account has incurred an account discrepancy assessment as a result of the transaction. Additionally or alternatively, in some embodiments of the method, the transaction involves a holder of the account. In some of these embodiments, the method further includes prompting the holder to consent to using the account discrepancy allocation to offset the account discrepancy assessment, where the prompting the holder occurs during the transaction.

BRIEF DESCRIPTION OF THE DRAWINGS

Figure 1:
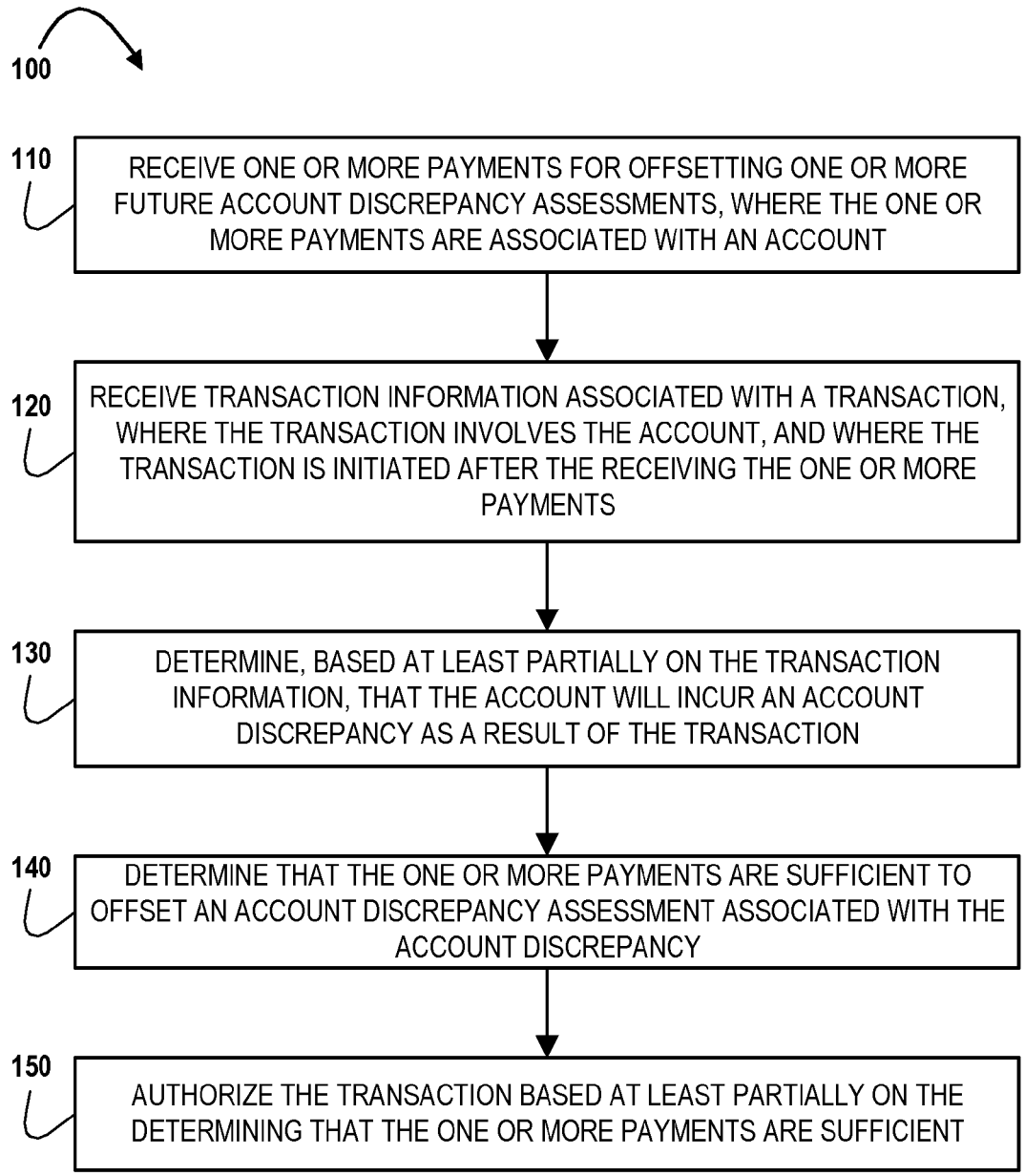
Figure 2:
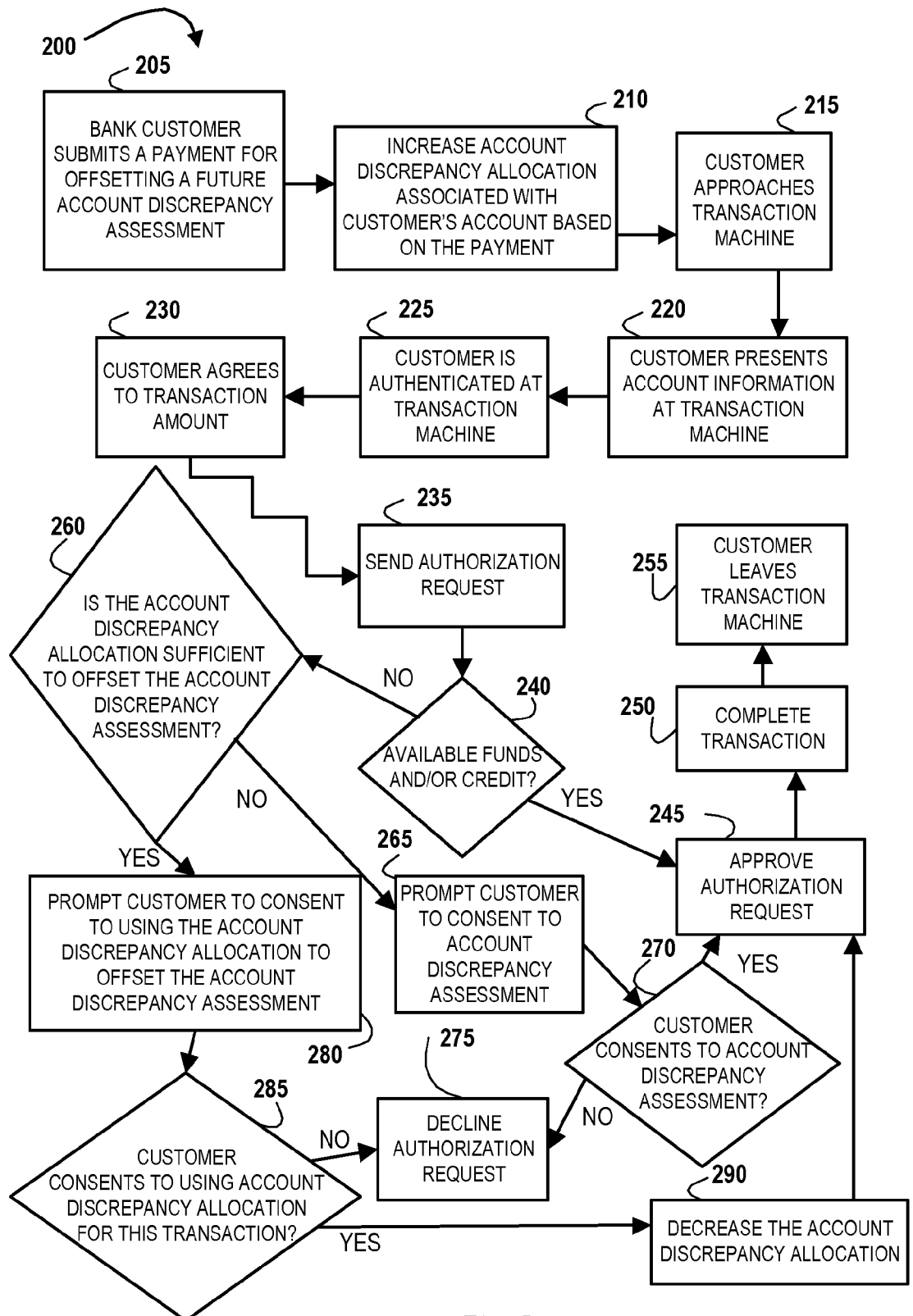
Figure 3:
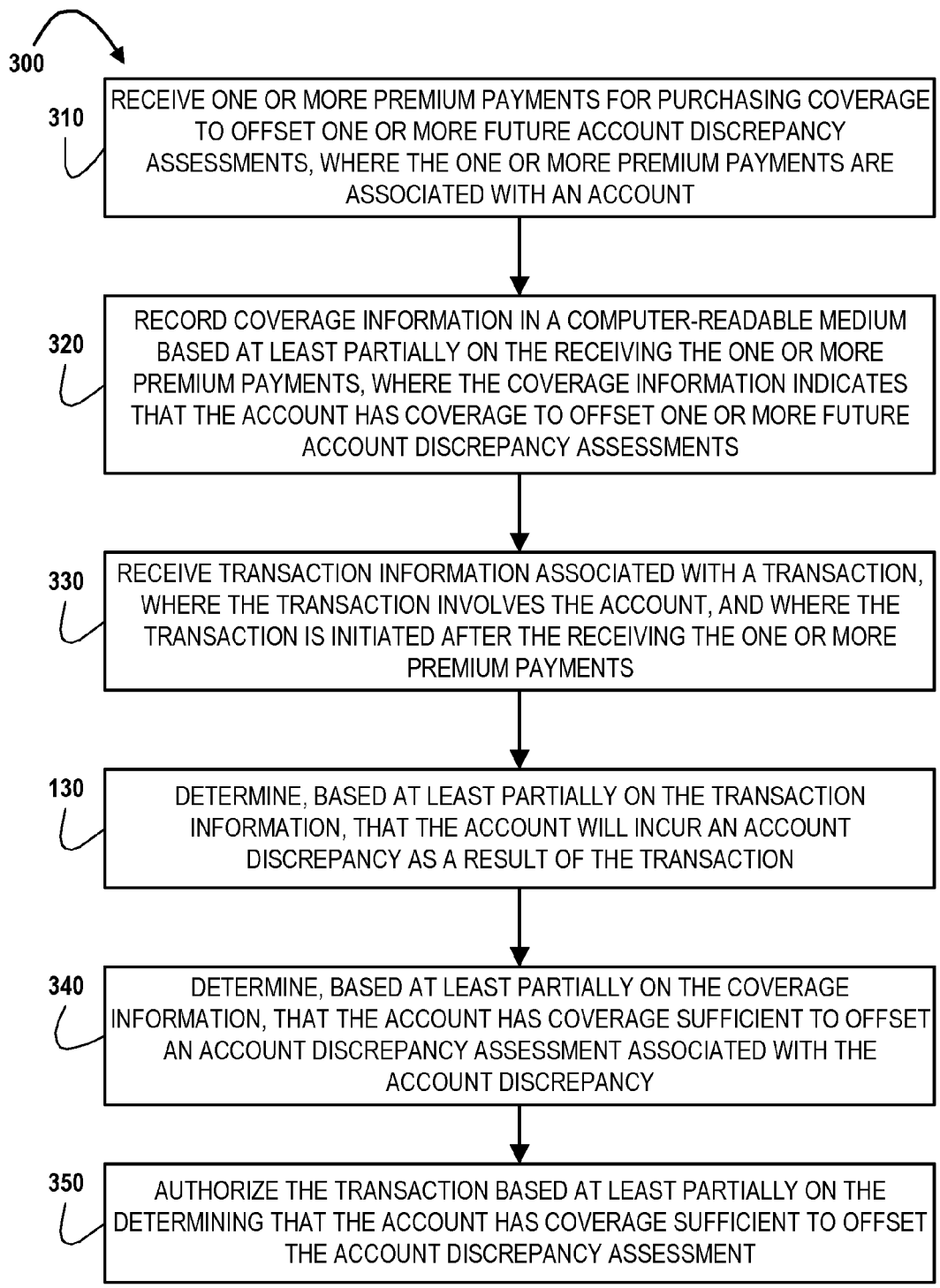
Figure 4:
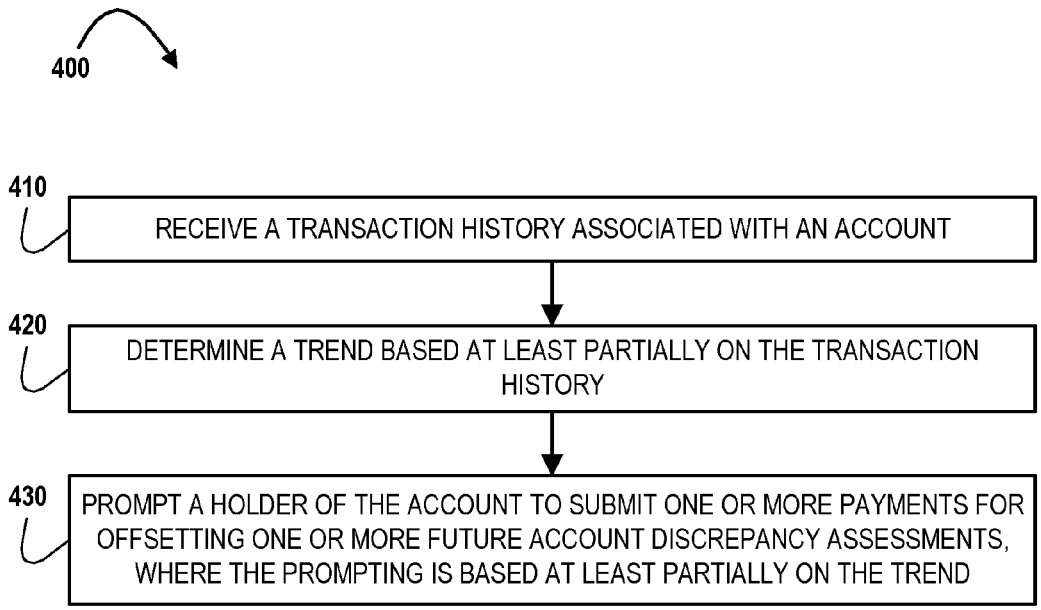
Figure 5:
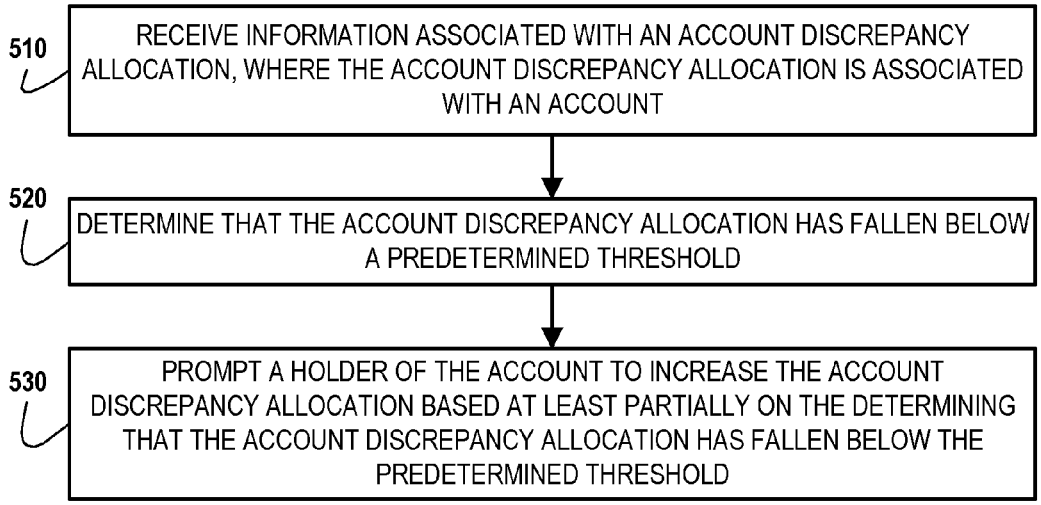
Figure 6:
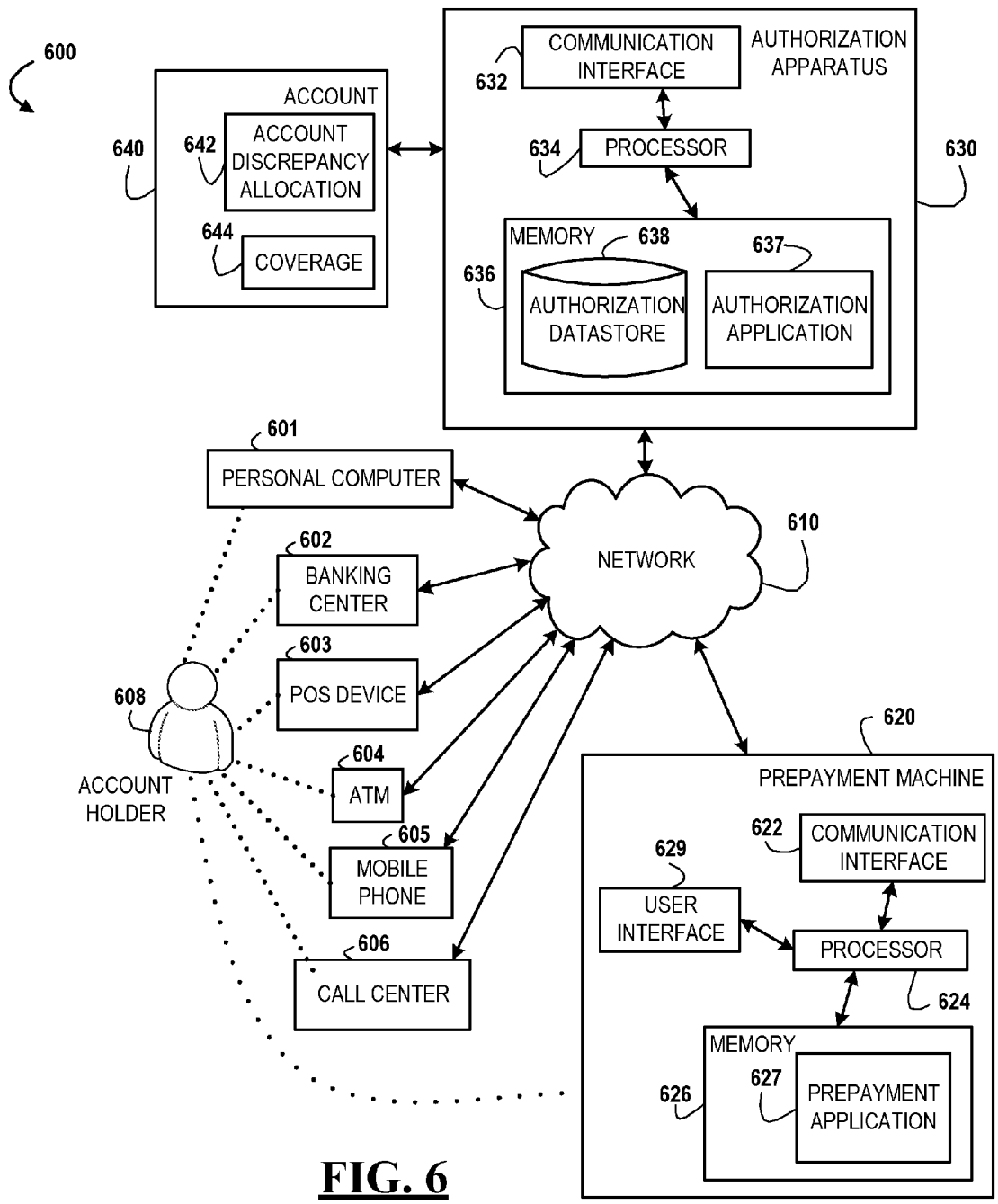
Figure 7:
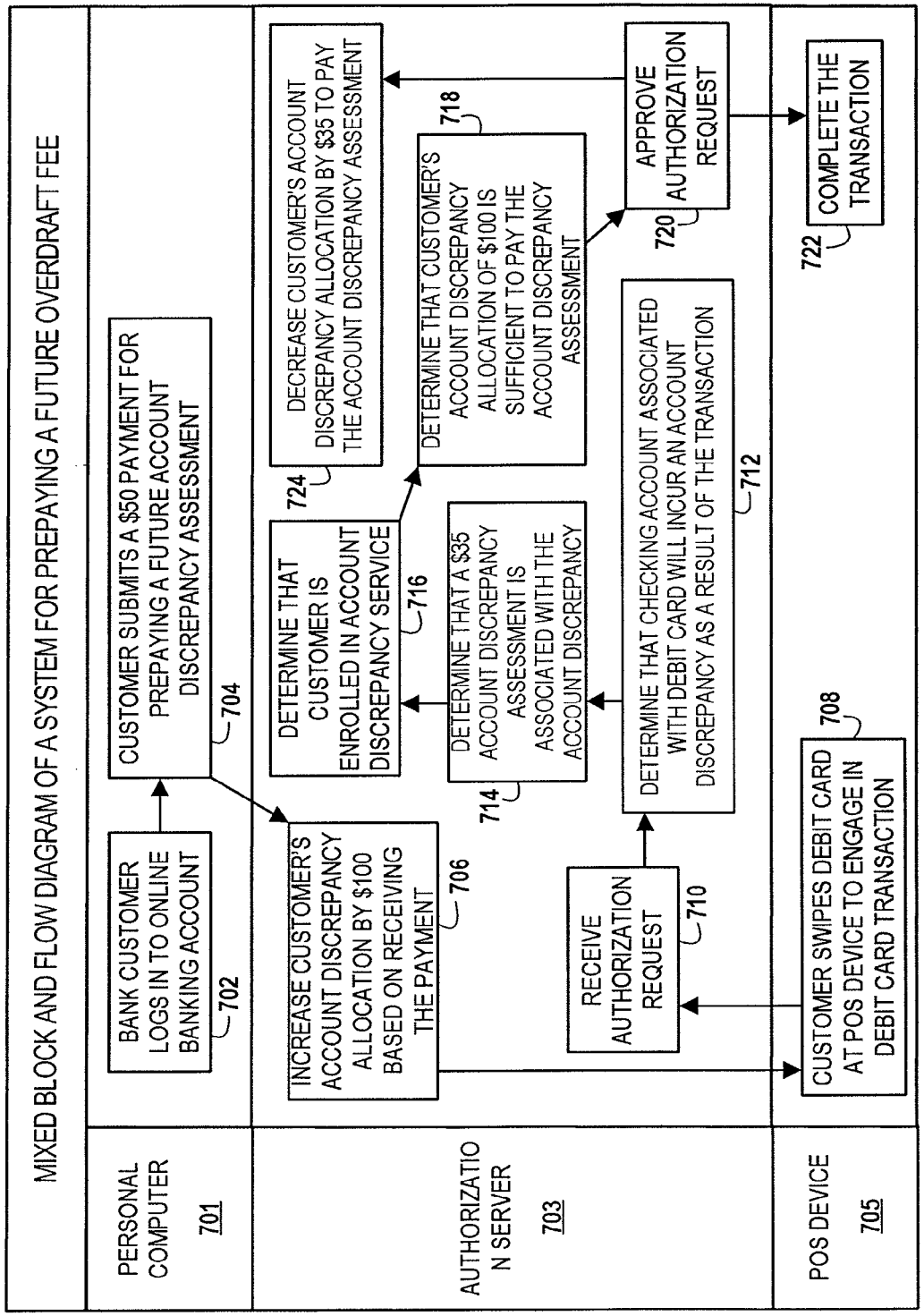

Having thus described some embodiments of the present invention in general terms, reference will now be made to the accompanying drawings, wherein:

FIG. 1 is a flow diagram illustrating a general process flow for offsetting future account discrepancy assessments, in accordance with an embodiment of the present invention;

FIG. 2 is a flow diagram illustrating a general process flow for using an account discrepancy allocation to offset future account discrepancy assessments, in accordance with an embodiment of the present invention;

FIG. 3 is a flow diagram illustrating a general process flow for using coverage to offset future account discrepancy assessments, in accordance with an embodiment of the present invention;

FIG. 4 is a flow diagram illustrating a general process flow for prompting an account holder to submit payments for offsetting future account discrepancy assessments based at least partially on a trend, in accordance with an embodiment of the present invention;

FIG. 5 is a flow diagram for prompting an account holder to increase an account discrepancy allocation based at least partially on a predetermined threshold, in accordance with an embodiment of the present invention;

FIG. 6 is a block diagram illustrating technical components of a system for offsetting future account discrepancy assessments, in accordance with an embodiment of the present invention; and FIG. 7 is a mixed block and flow diagram of a system for prepaying future deposit account discrepancy assessments, in accordance with an embodiment of the present invention.

DETAILED DESCRIPTION OF EMBODIMENTS OF THE PRESENT INVENTION

In general terms, embodiments of the present invention relate to methods and apparatuses for prepaying, covering, avoiding, negating, and/or otherwise offsetting (sometimes collectively referred to herein as "offsetting" for simplicity) future account discrepancy assessments. As an example, in some embodiments, an account holder can prepay one or more future account discrepancy assessments, so that if the account holder later engages in a transaction that results in an account discrepancy assessment, that account discrepancy assessment will be paid, covered, avoided, and/or otherwise offset. In other words, the account holder can offset an account discrepancy assessment before a transaction that results in that account discrepancy assessment is ever initiated.

In some cases, the account holder may have a financial incentive to prepay and/or otherwise offset future account discrepancy assessments. For example, in some embodiments, a regular account discrepancy assessment is $35 if paid after and/or at the time the account discrepancy assessment is incurred, but the account discrepancy assessment may be only $10 if paid in advance (i.e., paid before the holder engages in the transaction that results in the account discrepancy assessment). There may also be other incentives for prepaying, covering, and/or otherwise offsetting future account discrepancy assessments. For example, in some embodiments, when an account holder prepays one or more future account discrepancy assessments, the account holder also consents to later incurring and/or offsetting those one or more future account discrepancy assessments. As a result, the holder may not be required to provide this consent later (e.g., at the time of the account discrepancy transaction, etc.), which may spare the holder of any public embarrassment, annoyance, and/or hassle associated with providing the consent and/or being notified of the account discrepancy and/or account discrepancy assessment.

As used herein, the phrase "overage assessment" generally refers to the one or more assessments typically associated with incurring an account discrepancy (e.g., deposit account discrepancy, credit account discrepancy amount, etc.). Thus, the phrase "future account discrepancy assessment" generally refers to one or more account discrepancy assessments associated with incurring a "future account discrepancy," which itself results from a "future account discrepancy transaction." As used herein, the phrase "future account discrepancy transaction" generally refers to a transaction that: (a) is initiated, performed, engaged in, completed, and/or otherwise occurs in the future; and (b) if completed, will result in an account discrepancy (i.e., the "future account discrepancy"). It will be understood that a future account discrepancy transaction refers to a potential transaction that has not yet occurred and may never occur; however, if the future account discrepancy transaction does occur, it will result in an account discrepancy.

Referring now to FIG. 1, a general process flow 100 for offsetting future account discrepancy assessments is provided, in accordance with an embodiment of the present invention. In some embodiments, the process flow 100 is performed by an apparatus (i.e., one or more apparatuses) having hardware and/or software configured to perform one or more portions of the process flow 100. In such embodiments, as represented by block 110, the apparatus is configured to receive one or more payments for offsetting one or more future account discrepancy assessments, where the one or more payments are associated with an account. As represented by block 120, the apparatus is also configured to receive transaction information associated with a transaction, where the transaction involves the account, and where the transaction is initiated after the receiving the one or more payments. As represented by block 130, the apparatus is further configured to determine, based at least partially on the transaction information, that the account will incur an account discrepancy as a result of the transaction. As represented by block 140, the apparatus is configured to determine that the one or more payments are sufficient to offset an account discrepancy assessment associated with the account discrepancy. In addition, as represented by block 150, the apparatus is configured to authorize the transaction based at least partially on the apparatus determining that the one or more payments are sufficient.

For simplicity, the portion of the process flow 100 represented by block 130 is sometimes referred to herein as the "account discrepancy determination," and that the portion represented by block 140 is sometimes referred to herein as the "sufficiency determination." In addition, in some embodiments, the term "determine" is meant to have its one or more ordinary meanings (i.e., its one or more ordinary dictionary definitions), but in other embodiments, that term is additionally or alternatively meant to have the one or more ordinary meanings of one or more of the following terms: decide, conclude, verify, ascertain, find, discover, learn, calculate, observe, read, and/or the like. For example, in some embodiments, the apparatus having the process flow 100 is configured to make the account discrepancy determination by calculating, based at least partially on the transaction information and an available balance associated with the account, that the account will incur the account discrepancy as a result of the transaction.

Further, in some embodiments, the term "offset" is meant to have its one or more ordinary meanings, but in other embodiments, the term "offset" is additionally or alternatively meant to have the one or more ordinary meanings of one or more of the following terms: cover, counterbalance, pay, negate, avoid, and/or the like. For example, in some embodiments, the apparatus having the process flow 100 determines that the one or more payments are sufficient to offset the account discrepancy assessment by determining that the one or more payments are sufficient to avoid the account discrepancy assessment. As another example, in some embodiments, the apparatus determines that the one or more payments are sufficient to offset the account discrepancy assessment by determining that the one or more payments were used to prepay the account discrepancy assessment.

The apparatus having the process flow 100 illustrated in FIG. 1 can include one or more separate and/or different apparatuses. For example, in some embodiments, the apparatus may include the prepayment machine 620 and the authorization apparatus 630 shown in FIG. 6. Also, in some embodiments, one apparatus (e.g., the prepayment machine 620) is configured to perform the portions of the process flow 100 represented by block 110, and a second apparatus (e.g., the authorization apparatus 630) is configured to perform the portions represented by blocks 120-150. As still another example, in some embodiments, a single apparatus (e.g., the authorization apparatus 630) is configured to perform each and every portion of the process flow 100. It will also be understood that, in some embodiments, a transaction machine (e.g., the prepayment machine 620, a mobile phone, a personal computer, etc.) is configured to perform one or more (or all) of the portions of the process flow 100.

Regarding block 110, the account referred to in the process flow 100 can include any number and/or type of account(s). For example, in some embodiments, the account includes a checking account, savings account, money market account, investment account, brokerage account, certificate of deposit account, and/or any other type of deposit account. In some embodiments, the deposit account is one or more accounts that can incur a deposit account discrepancy and/or be discrepant. Of course, it will be understood that embodiments of the present invention may also apply to one or more credit accounts, such as a credit card account, line of credit (LOC) account, store credit account, and/or the like. Additionally or alternatively, in some embodiments, the credit account is one or more accounts that can incur an amount "credit account discrepancy." For example, if a credit account has a $5,000 credit limit and a $5,300 account balance, then it will be understood that the credit account has incurred a credit account discrepancy amount of $300.

Also, it will be understood that the one or more payments referred to in block 110 are associated with the account referred to in block 110. In some embodiments, the one or more payments are associated with the account because the payments are paid into an account discrepancy allocation that is associated with the account. In other embodiments, the one or more payments are associated with the account because the payments are used to purchase one or more account discrepancy assessment credits for the account. In still other embodiments, the one or more payments are associated with the account because the payments are used to purchase account discrepancy coverage for the account.

In some embodiments, the payments are associated with the account because the payments are sent by a holder of the account. Additionally or alternatively, in some embodiments, the payments are associated with the account because they are designated for the account (e.g., designated for prepaying account discrepancy assessments incurred by the account, designated for an account discrepancy allocation associated with the account, marked with information that identifies the account, etc.). In some alternative embodiments, the apparatus having the process flow 100 is configured to designate the one or more payments for offsetting one or more future account discrepancy assessments, where the apparatus is configured to designate the payments upon or after receiving them.

It will be understood that the one or more payments referred to in block 110 may not be limited for use with the account referred to in block 110. For example, in some embodiments, the one or more payments originate from a holder of the account who holds several other accounts, and the one or more payments may be used to offset one or more future account discrepancy assessments associated with account discrepancies incurred by any of the accounts held by the holder. However, in some embodiments, the one or more payments are associated with the account referred to in block 110 because they only can be used to offset future account discrepancy assessments that result from future account discrepancy transactions involving the account.

Further regarding block 110, the apparatus having the process flow 100 can be configured to receive the one or more payments in any way. In some embodiments, the apparatus receives the one or more payments from a holder of the account (and/or some other person) via a transaction machine (e.g., the prepayment machine 620, a personal computer, a mobile phone, etc.). As used herein, the phrase "transaction machine" generally refers to an interactive computer terminal that is configured to initiate, perform, complete, and/or facilitate one or more transactions. Examples of transaction machines include, but are not limited to, automated teller machines (ATMs), point-of-sale (POS) devices (e.g., merchant terminals, etc.), self-service machines, public and/or business kiosks (e.g., an Internet kiosk, mass transit kiosk, ticketing kiosk, DVD vending kiosk, airline/train check-in kiosk, bill pay kiosk, etc.), parking meters, vending machines, self-checkout machines (e.g., at a grocery store, retail store, etc.), mobile phones (e.g., feature phones, smart phones, etc.), gaming devices, computers (e.g., personal computers, tablet computers, laptop computers, etc.), personal digital assistants (PDAs), and/or the like.

In some embodiments, the transaction machine used to submit the one or more payments referred to in block 110 (and/or the transaction machine involved in the transaction referred to in block 120) is located in a public place and is available for public use (e.g., on a street corner, on the exterior wall of a banking center, at a public rest stop, etc.). In other embodiments, the transaction machine is additionally or alternatively located in a place of business and available for public and/or business customer use (e.g., in a retail store, post office, banking center, grocery store, etc.). In accordance with some embodiments, the transaction machine is not owned by the user of the transaction machine and/or the holder of the account referred to in block 110. However, in other embodiments, the transaction machine is located in a private place, is available for private use, and/or is owned by the user of the transaction machine and/or the holder.

It will be understood that, in some embodiments, the transaction machine used to submit the one or more payments referred to in block 110 is the same type of transaction machine (and/or the very same transaction machine) involved in the transaction referred to in block 120. Also, it will be understood that, in some embodiments, the one or more payments referred to in block 110 are submitted using a prepayment application (e.g., the prepayment application 627, etc.) that executes on the transaction machine. For example, in some embodiments, the holder submits the one or more payments by using one or more input features displayed and/or otherwise provided in association with a mobile banking application that executes on a mobile phone.

Regarding block 120, the transaction can include any transaction involving a deposit account and/or credit account. Exemplary transactions include, but are not limited to: purchasing, renting, selling, and/or leasing one or more goods and/or services (e.g., merchandise, groceries, tickets, etc.); withdrawing cash; making deposits (e.g., checks, cash, etc.); making payments to creditors (e.g., paying bills, paying taxes, etc.); sending remittances; transferring funds; loading money onto stored value cards; and/or the like. The transaction information referred to in block 110 can be any information that identifies, defines, describes, and/or is otherwise associated with the transaction. Exemplary transaction information includes, but is not limited to, the party(ies) involved in the transaction, the date and/or time of the transaction, the posting date of the transaction, the account(s) involved in the transaction, the transaction amount(s) associated with the transaction, the good(s) and/or service(s) involved in the transaction (e.g., product names, stock keeping unit (SKU) information, universal product code (UPC) information, etc.), a description of the transaction (which, itself, can include any transaction information, e.g., the description may describe the transaction status, the goods and/or services involved in the transaction, etc.), and/or the like.

The transaction information can also include any information that defines and/or identifies the type of the transaction. As understood herein, the transaction type of a transaction may be defined, at least in part, by the one or more goods and/or services involved in the transaction, the one or more types of accounts involved in the transaction (e.g., credit card transaction, savings account transaction, etc.), the one or more parties involved in the transaction (e.g., account holder, bank, teller, merchant, counterparty, etc.), when the transaction was initiated (e.g., time of day, day of week, etc.), and/or the like. In some embodiments, the transaction type is defined, at least in part, by the one or more channels through which the transaction is conducted, such as, for example, a point-of-sale (POS) device (e.g., merchant terminal, etc.), ATM, teller terminal, electronic banking account (e.g., online banking account, mobile banking account, SMS banking account, etc.), personal computer, kiosk, call center, and/or the like. Additionally or alternatively, in some embodiments, the transaction type is defined, at least in part, by the one or more instruments and/or methods used to conduct the transaction, such as, for example, paper checks, electronic checks, debit cards, credit cards, ATM cards, checkcards, wire transfers, online bill pay, automated clearing house (ACH), contactless payments, near field communication (NFC) interface payments, cash payments, and/or the like. In some embodiments, the transaction information additionally or alternatively identifies and/or describes one or more merchant category codes (MCCs) associated with the transaction.

Also regarding block 120, the apparatus having the process flow 100 can be configured to receive the transaction information in any way. For example, in some embodiments, the apparatus is configured to receive an authorization request associated with the transaction, where the authorization request includes the transaction information. In some embodiments, the apparatus is embodied as an authorization apparatus (e.g., the authorization apparatus 630, etc.) maintained by a financial institution, where the apparatus is configured to approve and/or decline authorization requests for debit transactions, credit transactions, ATM transactions, POS device transactions, and/or one or more other types of transactions that involve one or more accounts maintained by the financial institution. Additionally or alternatively, the apparatus can be configured to receive the transaction information directly or indirectly from the source of the transaction. For example, in some embodiments, the apparatus is located remotely from the transaction machine involved in the transaction but is operatively connected to the transaction machine via a network. As another example, the apparatus may include, be included in, and/or be embodied as a transaction machine. For example, in some embodiments, the apparatus having the process flow 100 is the transaction machine involved in the transaction referred to in block 120.

Further regarding block 120, it will be understood that the apparatus having the process flow 100 receives the one or more payments referred to in block 110 before the transaction referred to in block 120 is initiated. Said differently, in some embodiments, the apparatus is configured to perform the portions represented by blocks 120-150 at some point after the apparatus performs the portion represented by block 110. In some cases, the apparatus is configured to perform these portions hours, days, and/or months after the apparatus receives the one or more payments. In some embodiments, the process flow 100 actually represents two separate transactions, where the first transaction is represented by block 110 and the second transaction is represented by blocks 120-150.

Regarding block 130, the term "account discrepancy," as used herein, generally refers to the difference between: (a) the total amount of one or more purchases, draws, assessments, balance transfers, financial obligations, and/or other liabilities incurred, or that will be incurred, by an account as a result of a transaction, and (b) the total amount of funds and/or credit available to the account immediately prior to the transaction, where the total amount of the liabilities exceeds the total amount of available credit and/or funds. In some embodiments, the account discrepancy is referred to as a "deposit account discrepancy" if the account that incurs the account discrepancy, or will incur the account discrepancy, is a deposit account (e.g., checking account, savings account, brokerage account, etc.). For example, if a checking account has an available balance of $25 immediately before the checking account is used to pay a $50 electric bill, then the checking account will incur a $25 deposit account discrepancy as a result of paying the bill. In some embodiments, the term "deposit account discrepancy" refers to the amount by which the balance of an account is negative. For example, if a deposit account has an available balance of –$65, then the deposit account has one or more deposit account discrepancies totaling $65. Additionally or alternatively, in some embodiments, the term "deposit account discrepancy" refers to a situation where a deposit account is found to have unavailable funds to cover a transaction.

In some embodiments, the account discrepancy is referred to as "becoming discrepant" and/or "incurring an account discrepancy amount" if the account that incurs the account discrepancy or will incur the account discrepancy is a credit account (e.g., credit card account, line of credit (LOC) account, store credit account, etc.). For example, if a credit card account has $500 in available credit immediately prior to the credit card account being used to make a $600 purchase, then it will be understood that the credit card account will go over its credit limit by $100 as a result of the purchase. Additionally or alternatively, in some embodiments, the phrase "credit account discrepancy amount" generally refers to the difference between an account balance for the credit account and a credit limit (sometimes referred to as "credit line") associated with the credit account, where the account balance exceeds the credit limit. For example, if a credit account has a $5,000 credit limit and a $5,300 account balance, then it will be understood that the credit account has incurred one or more credit account discrepancy amounts totaling $300.

In some embodiments, the transaction referred to in block 130 is a present, initiated, and/or pending transaction. For example, in some embodiments, the apparatus is configured to make the account discrepancy determination after the transaction has been initiated (e.g., at a POS device) but before the transaction has been completed. In addition, the apparatus can be configured to make the account discrepancy determination in any way. For example, in some embodiments, the apparatus is configured to make the account discrepancy determination by determining that the deposit account does not have sufficient available funds and/or credit to cover the transaction.

Additionally or alternatively, in some embodiments, the apparatus is an authorization apparatus (e.g., the authorization apparatus 630 referred to in FIG. 3, etc.) that is configured to consider, authorize, and/or decline authorization requests and/or financial transactions. Also, the apparatus can be configured to make account discrepancy determinations in real time and/or in substantially real time. In some embodiments, the apparatus having the process flow 100 is configured to make the account discrepancy determination immediately or nearly immediately after the account discrepancy transaction has been initiated at the transaction machine (e.g., upon the swipe of a debit or credit card through a POS device, upon the holder selecting an amount to withdraw from an ATM, etc.). In other embodiments, the apparatus is configured to make the account discrepancy determination at any time from when the holder approaches the transaction machine to when the holder leaves the transaction machine. Additionally or alternatively, the apparatus can be configured to make the account discrepancy determination at any time from when the holder initiates and/or engages in the transaction at the transaction machine to when the transaction is completed.

Regarding block 140, the apparatus can be configured to make the sufficiency determination in any way. In some embodiments, the apparatus is configured to determine that the one or more payments are sufficient by determining that an account discrepancy allocation associated with the account is sufficient to offset the account discrepancy assessment. For example, in some embodiments, the account discrepancy allocation has a balance, and the apparatus is configured to make the sufficiency determination by determining that the amount of the account discrepancy assessment is less than the amount of the account discrepancy allocation. As another example, in some embodiments, the account discrepancy allocation has a number of account discrepancy assessment credits (i.e., a credit that can be used to pay, cover, avoid, and/or otherwise offset an account discrepancy assessment), and the apparatus is configured to make the sufficiency determination by determining that the account discrepancy allocation has at least one account discrepancy assessment credit. It will be understood that, in some embodiments, one or more portions of the account discrepancy allocation may expire. For example, in some embodiments, an account discrepancy assessment credit expires after one year if the credit is not used. In other embodiments, as described in more detail in connection with FIG. 3, the apparatus is configured to make the sufficiency determination by determining that the account has coverage sufficient to offset the account discrepancy assessment. In some embodiments, this coverage is similar to insurance coverage and has a coverage period, a coverage amount, and/or is purchased via one or more premium payments.

It will be understood that, in some embodiments, the account discrepancy allocation (and/or the one or more payments) associated with the account is separate from, and therefore does not comprise any portion of, the balance of the account. In other words, in some embodiments, the account balance cannot serve as the account discrepancy allocation or vice versa. Accordingly, in such embodiments, the account discrepancy allocation is essentially treated as an "account" that is separate from the account referred to in block 110. Also, it will be understood that, in some embodiments, the future account discrepancy assessment referred to in block 110 is the account discrepancy assessment referred to in block 140.

Regarding block 150, the apparatus can be configured to authorize the transaction in any way. For example, in some embodiments, the apparatus is configured to send, to the transaction machine referred to in the process flow 100, one or more instructions to complete the transaction. In some embodiments, the apparatus is configured to authorize the transaction by approving an authorization request associated with the transaction. In some embodiments, the authorization request approved by the apparatus having the process flow 100 was included in the transaction information referred to in block 110.

The apparatus having the process flow 100 can be configured to perform any portion of the process flow 100 represented by blocks 110-150 upon or after one or more triggering events (which, in some embodiments, is one or more of the other portions of the process flow 100). As used herein, a "triggering event" refers to an event that automatically (i.e., without human intervention) triggers the execution, performance, and/or implementation of a triggered action, either immediately, nearly immediately, or sometime after (e.g., within minutes, hours, etc.) the occurrence of the triggering event. For example, in some embodiments, the apparatus having the process flow 100 is configured such that the apparatus making the sufficiency determination (the triggering event) automatically and immediately or nearly immediately triggers the apparatus to authorize the transaction (the triggered action).

In accordance with some embodiments, the apparatus can be configured to automatically perform one or more of the portions represented by blocks 110-150, whereas in other embodiments, one or more of the portions of the process flow 100 require and/or involve human intervention (e.g., a user operating the apparatus configured to perform the process flow 100, etc.). In addition, it will be understood that, in some embodiments, the apparatus (and/or a user thereof) is configured to perform one or more portions of the process flow 100, from start to finish, within moments, seconds, and/or minutes (e.g., within approximately 1-15 minutes from start to finish, etc.). As an example, in some embodiments, the apparatus is configured to authorize the transaction within moments, seconds, and/or minutes (e.g., within approximately 1-15 minutes, etc.) of: (a) receiving the transaction information associated with the transaction; (b) making the account discrepancy determination; and/or (c) making the sufficiency determination. As another example, in some embodiments, the apparatus having the process flow 100 is configured to authorize the transaction while the holder of the account is still at and/or near the transaction machine involved in the transaction referred to in block 120.

In some embodiments, the apparatus having the process flow 100 is configured to implement an account discrepancy service. As used herein, the phrase "account discrepancy service" generally refers to a service that provides an account holder with the funds and/or credit necessary to complete an account discrepancy transaction. For example, in some embodiments, where a transaction, if completed, would deposit account discrepancy a checking account by $10, the account discrepancy service can provide the checking account with the $10 needed to complete the transaction. As another example, in some embodiments, the account discrepancy service enables an account holder to consent to and/or prepay one or more future account discrepancy assessments prior to engaging in one or more future account discrepancy transactions.

The account discrepancy service includes one or more terms, which define the one or more rights, responsibilities, privileges, assessments, features, and/or obligations of the account discrepancy service. For example, in some embodiments, the one or more terms of the account discrepancy service describe how the account discrepancy service works; identify the account discrepancy service provider; define what constitutes an account discrepancy; identify the one or more account discrepancy assessments assessed for enrolling in the account discrepancy service, for participating in the account discrepancy service, and/or for engaging in an account discrepancy transaction; and/or the like. In some embodiments, the account discrepancy service is provided by a financial institution, such as a bank, and not by an account held by and/or otherwise associated with the holder. For example, in some embodiments, the account discrepancy service is provided by the same financial institution that maintains the apparatus having the process flow 100 and/or the account that incurs, or will incur, the account discrepancy.

It will be understood that, in some embodiments, the account discrepancy service (and/or the account discrepancy service provider) is regulated in the United States by the Electronic Funds Transfer Act, also known as Federal Reserve Board Regulation E (hereinafter "Regulation E"). In other embodiments, the account discrepancy service (and/or account discrepancy service provider) is regulated in the United States by the Credit Card Accountability Responsibility and Disclosure Act of 2009, which is codified in the United States as Public Law No. 111-24 (sometimes referred to herein, for simplicity, as the "Credit CARD Act of 2009" or the "CARD Act"). In some embodiments, the account discrepancy service does not contractually obligate the account discrepancy service provider to cover account discrepancies. In other words, in such embodiments, the account discrepancy service provider may choose to cover deposit account discrepancy and/or credit account discrepancy transactions at its discretion. However, in other embodiments, the account discrepancy service provider is contractually obligated to cover account discrepancies incurred by an account.

In some embodiments, one or more portions of the process flow 100 may be configured to comply with one or more portions of a law, rule, and/or regulation that is directed to and/or otherwise relates to an account discrepancy (collectively referred to herein as "account discrepancy regulation" for simplicity). For example, in the United States, Regulation E regulates deposit account discrepancy services provided by financial institutions. Accordingly, it will be understood that some embodiments of the present invention enable a financial institution to comply with Regulation E, the CARD Act, and/or one or more other account discrepancy regulations. For example, in some embodiments, the receiving the one or more payments for offsetting one or more future account discrepancy assessments may comply with one or more notification, consent, opt-in, and/or revocation requirements of an account discrepancy regulation. In some embodiments, as required by one or more account discrepancy regulations, the holder must opt into and/or otherwise enroll in the account discrepancy service before the holder can participate in and/or otherwise use the account discrepancy service. As such, in some embodiments, the apparatus having the process flow 100 can be configured to prompt the account holder to consent to, accept, and/or agree to one or more terms of an account discrepancy service. Also, it will be understood that the account discrepancy service is sometimes referred to herein as a deposit account discrepancy service if the account participating in the service is a deposit account. Also, the account discrepancy service is sometimes referred to herein as a credit account discrepancy service if the account participating in the service is a credit account.

It will also be understood that the apparatus having the process flow 100 can be configured to perform any one or more portions of any embodiment described and/or contemplated herein, including, for example, any one or more portions of the process flows 200, 300, 400, and/or 500 described later herein. Also, the number, order, and/or content of the portions of the process flow 100 are exemplary and may vary. In addition, the process flow 100 can include one or more additional and/or alternative portions. For example, in some alternative embodiments of the process flow 100, the apparatus having the process flow 100 is configured to: (a) determine that the account has incurred an account discrepancy assessment as a result of the transaction (i.e., make an "account discrepancy assessment determination"); and (b) decrease an account discrepancy allocation associated with the account based at least partially on making the account discrepancy assessment determination. In some of these embodiments, the apparatus is configured to perform one or both of these functions after the transaction has occurred and/or been completed.

As another example, in some alternative embodiments, the apparatus having the process flow 100 is configured to pay, cover, and/or otherwise offset the account discrepancy assessment. In some of these embodiments, the apparatus is configured to perform this function simultaneous with, after, and/or based at least partially on the apparatus making the account discrepancy determination, making the sufficiency determination, and/or authorizing the transaction. In some embodiments, the apparatus is configured to offset the account discrepancy assessment using an account discrepancy allocation, account discrepancy assessment credit, and/or coverage associated with the account. In some of these embodiments, the account discrepancy allocation, account discrepancy assessment credit, and/or coverage is used to offset the account discrepancy assessment but not the account discrepancy itself. For example, if an account incurs an $100 deposit account discrepancy and an associated $35 deposit account discrepancy assessment, the apparatus having the process flow 100 may be configured to pay the $35 deposit account discrepancy assessment with funds from an deposit account discrepancy allocation associated with the account, but the apparatus will not use funds from the deposit account discrepancy allocation to pay the $100 deposit account discrepancy. It will be understood that this limitation may be imposed by one or more account discrepancy regulations.

As another example, in some alternative embodiments, the apparatus having the process flow 100 is configured to prompt the user of the transaction machine (e.g., the holder of the account referred to in block 110) to consent to using the one or more payments (and/or the account discrepancy allocation, account discrepancy assessment credit, and/or coverage) to offset the account discrepancy assessment referred to in block 140. In some embodiments, the apparatus is configured to prompt the user sometime after the apparatus receives the transaction information, as represented by block 120, and/or sometime before the apparatus authorizes the transaction, as represented by block 150. For example, in some embodiments, the apparatus is configured to prompt the user to consent during the transaction referred to in block 120. As another example, in some embodiments, the apparatus is configured to prompt the user to consent to using the one or more payments (and/or the account discrepancy allocation, account discrepancy assessment credit, and/or coverage) to offset the account discrepancy assessment after the apparatus determines that the account will incur the account discrepancy.

Also, it will be understood that the apparatus can be configured to prompt the user in any way and/or the user may give his consent (and/or decline to give his consent) in any way. For example, in some embodiments, while the user is at the transaction machine involved in the transaction referred to in block 120, the apparatus having the process flow 100 sends a communication (e.g., text message, email, phone call, etc.) to the user's mobile device (e.g., mobile phone, portable gaming device, etc.) that notifies the user of the account discrepancy and/or the account discrepancy assessment. That same communication may additionally or alternatively prompt the user to consent to using the one or more payments (and/or the account discrepancy allocation, account discrepancy assessment credit, and/or coverage) to offset the account discrepancy assessment. In such embodiments, the user may provide his consent by sending a return communication to the apparatus that indicates his consent. Of course, the user may also be able indicate, via the return communication, that the user does not consent to using the one or more payments (and/or the account discrepancy allocation, account discrepancy assessment credit, and/or coverage) to offset the account discrepancy assessment. In some embodiments, the apparatus automatically determines that the user does not consent if the user does not respond to the first communication within a predetermined period of time (e.g., 30 seconds, 5 minutes, etc.).

In other embodiments, the apparatus is configured to prompt the user to consent (and/or to receive the user's consent) via a transaction machine associated with the transaction referred to in block 120 (e.g., via a user interface associated with the transaction machine). It will be understood that the user may be prompted to consent to using the one or more payments via a first channel (e.g., a mobile phone, etc.) and then provide his consent to using the one or more payments via a second channel (e.g., the transaction machine, etc.). It will also be understood that the apparatus may be configured to authorize the transaction based at least partially on the apparatus receiving the user's consent to using the one or more payments (and/or the account discrepancy allocation, account discrepancy assessment credit, and/or coverage) to offset the account discrepancy assessment.

Of course, the apparatus having the process flow 100 can be configured to prompt the holder via any communication device and/or medium, such as, for example, a personal computer, mobile phone, ATM, POS device, online banking account, email account, social media network, and/or the like. In some embodiments, the prompting the holder may include sending and/or presenting, to the user and/or holder, one or more questions, instructions, requests, messages, graphics, sounds, telephone calls, text messages, SMS messages (e.g., traditional SMS messages, 2-way SMS messages, etc.), actionable alerts, instant messages, voice messages, voice recordings, interactive voice response (IVR) communications, pages, emails, communications specific to one or more social media networks and/or applications, user interfaces (e.g., dashboard screens, web pages, etc.) and/or the like. For example, in some embodiments, the apparatus having the process flow 100 sends a text message to the holder's mobile phone that notifies the holder of the account discrepancy, notifies the holder of the account discrepancy assessment, and/or prompts the holder to consent to the account discrepancy and/or account discrepancy assessment by return text message, all during the transaction and/or while the holder is still standing at the transaction machine.

Referring now to FIG. 2, a more-detailed process flow 200 for offsetting future account discrepancy assessments is provided, in accordance with an embodiment of the present invention. It will be understood that the process flow 200 illustrated in FIG. 2 represents an example embodiment of the process flow 100 described in connection with FIG. 1. In accordance with some embodiments, one or more portions of the process flow 200 are performed by an apparatus having hardware and/or software configured to perform one or more portions of the process flow 200. The apparatus having the process flow 200 can include, be included in, be embodied as, and/or be operatively connected to the transaction machine referred to in the process flow 200. In this example embodiment, the apparatus having the process flow 200 is maintained by a bank for the benefit of its customers. Also in this example embodiment, the customer referred to in the process flow 200 is the user of the transaction machine and a customer of the bank. In addition, the account referred to in the process flow 200 is an account (e.g., checking account, credit card account, etc.) held by the customer and maintained by the bank. In addition, in this example embodiment, the account held by the customer is associated with an account discrepancy allocation that can be used to offset one or more future account discrepancy assessments incurred by the account and/or by the customer. Further, in this example embodiment, the customer and/or the account are enrolled in an account discrepancy service provided by the bank.

As represented by block 205, the bank customer submits a payment for offsetting a future account discrepancy assessment. For example, in some embodiments, the customer uses an online banking account to transfer money from an account held by the customer to an account discrepancy allocation. As a result of submitting the payment, the bank increases the account discrepancy allocation associated with the customer's account, as represented by block 210. It will be understood that, in some embodiments, the portions of the process flow 200 represented by blocks 205 and 210 occur before one or more (or all) of the other portions of the process flow 200. For example, in some embodiments, the customer submits the payment for offsetting a future account discrepancy assessment, as represented by block 205, seconds, minutes, hours, and/or days before the customer approaches the transaction machine referred to in block 215.

Some time after submitting the payment, the customer approaches the transaction machine for the purpose of engaging in a transaction using the transaction machine, as represented by block 215. In some embodiments, this transaction begins when the customer approaches the transaction machine for engaging in the transaction, as represented by block 215, and ends when the customer leaves the transaction machine, as represented by block 255. After arriving at the transaction machine, the customer presents account information at the transaction machine, as represented by block 220. For example, in some embodiments where the transaction machine is a POS device, the customer may swipe a debit and/or credit card associated with the account through the POS device in order to communicate account information associated with the account to the POS device and/or the apparatus having the process flow 200. As another example, in some embodiments where the transaction machine is a personal computer, the customer may input account information into a web page associated with the transaction that is displayed at the personal computer. After the account information is presented, the transaction machine (and/or the apparatus having the process flow 200) identifies and/or authenticates the customer, as represented by block 225. In some embodiments, the transaction machine authenticates the customer based at least partially on one or more credentials (e.g., username/password, PIN, checkcard, etc.) the customer presents to the transaction machine.

After being authenticated, the customer selects the transaction and/or agrees to the transaction amount, as represented by block 230. Then, as represented by block 235, the transaction machine sends an authorization request to the apparatus having the process flow 200, where the authorization request identifies and/or describes the transaction, the customer, the account, and/or the like. After receiving the authorization request, the apparatus having the process flow 200 must determine whether the account has sufficient available funds and/or credit to cover the transaction, as represented by block 240. In other words, the apparatus having the process flow 200 is configured to determine whether the account will incur an account discrepancy as a result of the transaction. If the account will not incur an account discrepancy, then the apparatus, as represented by blocks 245 and 250, approves the authorization request and/or instructs the transaction machine to complete the transaction. After the transaction is completed at the transaction machine, the customer leaves the transaction machine, as represented by block 255.

However, if the apparatus having the process flow 200 determines that the account will incur an account discrepancy as a result of the transaction (i.e., the account does not have sufficient available funds and/or credit to cover the transaction), then the apparatus is configured to determine whether the customer's account discrepancy allocation is sufficient to offset the account discrepancy assessment associated with the account discrepancy, as represented by block 260. For example, in some embodiments, the apparatus is configured to make the sufficiency determination by determining whether the amount of the account discrepancy assessment is less than the amount of the account discrepancy allocation. As another example, in some embodiments, the account discrepancy allocation has a number of account discrepancy assessment credits, and the apparatus is configured to make the sufficiency determination by determining whether the account discrepancy allocation has at least one account discrepancy assessment credit.

If the account discrepancy allocation is not sufficient, then the apparatus and/or the bank may be required, by one or more account discrepancy regulations, to obtain the customer's consent to incur the account discrepancy and/or the account discrepancy assessment before the apparatus and/or the bank approves the authorization request. As such, the apparatus having the process flow 200 (and/or the transaction machine) is configured prompt the customer to consent to the account discrepancy assessment and/or the account discrepancy, as represented by block 265. Thereafter, the apparatus is configured to determine whether the customer consents to incurring the account discrepancy and/or the account discrepancy assessment, as represented by block 270. If the customer does not consent to the account discrepancy assessment and/or the account discrepancy, then the apparatus is configured to decline the transaction, as represented by block 275. However, if the customer does consent to the account discrepancy assessment and/or the account discrepancy, then the apparatus approves the authorization request and the transaction is completed, as represented by blocks 245-255. In some embodiments, the apparatus is additionally configured to store the customer's consent in a datastore (e.g., computer-readable memory, etc.), which, in some embodiments, complies with one or more requirements of an account discrepancy regulation.

Referring again to block 265, it will be understood that the customer may be prompted to consent in any way and/or the customer may give his consent in any way. For example, in some embodiments, while the customer is at the transaction machine, the apparatus having the process flow 200 sends a text message to the customer's mobile phone that notifies the customer of the account discrepancy assessment and prompts the customer to consent to incurring the account discrepancy assessment by return text message. In other embodiments, the customer consents to the account discrepancy assessment by using one or more input features displayed and/or otherwise provided in association with a mobile banking application that executes on the customer's mobile phone. In still other embodiments, the customer is prompted to consent and/or consents to the account discrepancy assessment via the transaction machine referred to in block 215 (e.g., via a user interface associated with the transaction machine, etc.). It will be understood that the customer may be prompted to consent to the account discrepancy assessment via a first channel (e.g., a mobile phone, etc.) and then provide his consent to the account discrepancy assessment via a second channel (e.g., the transaction machine, etc.).

As another example, in some embodiments, the customer consents to the account discrepancy assessment by presenting (or re-presenting) account information to the transaction machine after being prompted to consent to the account discrepancy assessment. Specifically, in some embodiments where the transaction machine is a POS device, the apparatus having the process flow 100 is configured to prompt the customer to consent to the account discrepancy assessment by re-swiping a debit or credit card through the POS device. If the customer then re-swipes the debit or credit card through the POS device, then the apparatus determines that the customer has consented to the account discrepancy assessment.

Referring again to block 260, if the apparatus having the process flow 200 determines that the account discrepancy allocation is sufficient to offset the account discrepancy assessment, then the apparatus is configured to prompt the customer to consent to using the account discrepancy allocation (e.g., the balance of the account discrepancy allocation, an account discrepancy assessment credit in the account discrepancy allocation, etc.) to offset the account discrepancy assessment associated with the account discrepancy, as represented by block 280. In other words, the apparatus is configured to prompt the customer to consent to using the account discrepancy allocation for this particular transaction. As with the prompting referred to in block 265, the apparatus having the process flow 200 can be configured to prompt the customer to consent to using the account discrepancy allocation in any way and the customer can consent to using the account discrepancy allocation in any way. For example, in some embodiments, while the customer is at the transaction machine, the apparatus having the process flow 200 sends a communication to the customer's mobile phone (and/or to the transaction machine) that notifies the customer of the account discrepancy assessment, notifies the customer of the balance of the account discrepancy allocation, and/or prompts the customer to consent to using the balance of the account discrepancy allocation to offset the account discrepancy assessment. As another example, in some embodiments, while the customer is at the transaction machine, the apparatus having the process flow 200 (and/or the transaction machine) presents a user interface at the transaction machine that notifies the customer of the account discrepancy assessment, notifies the customer of the balance of the account discrepancy allocation, and/or prompts the customer to consent to using the balance of the account discrepancy allocation to offset the account discrepancy assessment.

After prompting the customer, the apparatus is configured to determine whether the customer consents to using the account discrepancy allocation to offset the account discrepancy assessment, as represented by block 285. If the customer indicates (e.g., via return communication) that the customer does not consent, then the apparatus is configured to decline the transaction, as represented by block 275. For example, in some cases, the customer may indicate to the apparatus that the customer does not consent to using the account discrepancy allocation for this transaction because the customer may wish to use the account discrepancy allocation to offset another (and/or future) account discrepancy assessment (i.e., not the account discrepancy assessment referred to in block 260). However, if the customer indicates that the customer does consent to using the account discrepancy allocation for this transaction to offset the account discrepancy assessment, then the apparatus decreases the account discrepancy allocation, as represented by block 290, and approves the authorization request, as represented by block 245. Again, it will be understood that the customer may indicate his consent to using the account discrepancy allocation in any way. Also, it will be understood that, in this example embodiment, the apparatus is configured to assume that the customer would not consent to incurring the account discrepancy and/or account discrepancy assessment if the customer does not consent to using the account discrepancy allocation to offset the account discrepancy assessment; however, in other embodiments, the apparatus may be configured to prompt the customer to consent to incurring the account discrepancy assessment and/or the account discrepancy, even if the customer does not consent to using the account discrepancy allocation to offset the account discrepancy assessment.

In accordance with some embodiments, one or more portions of the process flow 200 may comply with one or more requirements of an account discrepancy regulation (e.g., Regulation E and/or the CARD Act in the United States, etc.). For example, in some embodiments, receiving the customer's consent to the account discrepancy and/or account discrepancy assessment, as represented by the "Yes" arrow between blocks 270 and 245 may comply with one or more requirements of an account discrepancy regulation. In addition, in some embodiments, the receiving the customer's consent may comply with one or more account discrepancy regulation requirements because, for example, the customer was first authenticated by the transaction machine and/or by the apparatus having the process flow 200. As another example, in some embodiments, the customer submitting the payment for offsetting a future account discrepancy assessment may satisfy one or more consent and/or notification requirements of an account discrepancy regulation because, for example, the customer may be deemed to have consented to incurring a future account discrepancy and/or future account discrepancy assessment by submitting the payment.

Of course, it will also be understood that the embodiment illustrated in FIG. 2 is merely exemplary and that other embodiments may vary without departing from the scope and spirit of the present invention. For example, in some alternative embodiments where the customer's account discrepancy allocation is sufficient to offset the account discrepancy assessment, the apparatus may be configured to decrease the account discrepancy allocation after the apparatus approves the authorization request. In some of these embodiments, the apparatus is configured to decrease the account discrepancy allocation based at least partially on (e.g., because of, as a result of, in response to, etc.) the apparatus approving the authorization request. As another example, in some alternative embodiments, if the apparatus determines that the account discrepancy allocation is sufficient to offset the account discrepancy assessment, then the apparatus may automatically approve the authorization request without prompting the customer to consent to using the account discrepancy allocation to offset the account discrepancy assessment or without otherwise notifying the customer of the account discrepancy assessment (or account discrepancy). As such, the customer can be spared of any public embarrassment, annoyance, and/or hassle associated with providing the consent and/or being notified of the account discrepancy assessment and/or account discrepancy. Indeed, in some of these alternative embodiments, the customer may not even know the transaction resulted in an account discrepancy unless and/or until after the transaction is completed.

It will be understood that the apparatus having the process flow 200 can be configured to perform one or more portions of the process flow 200 in real time, in substantially real time, and/or at one or more predetermined times. The apparatus having the process flow 200 may additionally or alternatively be configured to perform any of the portions of the process flow 200 represented by blocks 205-290 upon or after one or more triggering events (which, in some embodiments, is the performance of one or more of the other portions of the process flow 200). In addition, in some embodiments, the apparatus having the process flow 200 (and/or a user thereof) is configured to perform one or more portions of the process flow 200, from start to finish, within moments, seconds, and/or minutes (e.g., within approximately 1-15 minutes, etc.).

Referring now to FIG. 3, a process flow 300 is provided for using coverage to offset future account discrepancy assessments, in accordance with an embodiment of the present invention. It will be understood that the process flow 300 illustrated in FIG. 3 represents an example embodiment of the process flow 100 described in connection with FIG. 1. In accordance with some embodiments, one or more portions of the process flow 300 are performed by an apparatus having hardware and/or software configured to perform one or more portions of the process flow 300. In such embodiments, the apparatus having the process flow 300 is configured to receive one or more premium payments for purchasing coverage to offset one or more future account discrepancy assessments, where the one or more premium payments are associated with an account, as represented by block 310. As represented by block 320, the apparatus is also configured to record coverage information in a computer-readable medium based at least partially on the receiving the one or more premium payments, where the coverage information indicates that the account has coverage to offset one or more future account discrepancy assessments.

As represented by block 330, the apparatus having the process flow 300 is also configured to receive transaction information associated with a transaction, where the transaction involves the account, and where the transaction is initiated after the receiving the one or more premium payments. Like the process flow 100, the apparatus is also configured to determine, based at least partially on the transaction information, that the account will incur an account discrepancy as a result of the transaction, as represented by block 130 of the process flow 300. In addition, as represented by block 340, the apparatus is configured to determine, based at least partially on the coverage information, that the account has coverage sufficient to offset an account discrepancy assessment associated with the account discrepancy. As represented by block 350, the apparatus is configured to authorize the transaction based at least partially on the apparatus determining that the account has coverage sufficient to offset the account discrepancy assessment.

In some embodiments, the coverage referred to in block 320 is similar to insurance coverage. For example, in some embodiments, the coverage includes a predetermined coverage amount for offsetting one or more future account discrepancy assessments. In such embodiments, the apparatus may be configured to determine that the account has coverage sufficient to offset the account discrepancy assessment by determining that the amount of the account discrepancy assessment is less than the predetermined coverage amount. As another example, in some embodiments, the coverage includes a predetermined coverage period for offsetting one or more future account discrepancy assessments. In such embodiments, the apparatus may be configured to determine that the account has coverage sufficient to offset the account discrepancy assessment by determining that the transaction occurs during the predetermined coverage period. As yet another example, in some embodiments, the coverage is sufficient to offset a predetermined number of future account discrepancy assessments. In such embodiments, the apparatus having the process flow 300 may be configured to determine that the account has coverage sufficient to offset the account discrepancy assessment by determining that the account discrepancy assessment is within the predetermined number. Also, it will be understood that, in some embodiments, the account has coverage to offset one or more future account discrepancy assessments because a holder of the account has coverage to offset one or more future account discrepancy assessments. In other words, in some embodiments, the account holder may have coverage that extends to one or more other accounts held by the account holder. However, in other embodiments, the coverage referred to in block 310 is uniquely associated with the account referred to in block 310.

Referring now to FIG. 4, a process flow 400 is provided for prompting an account holder to submit payments for offsetting future account discrepancy assessments based at least partially on a trend, in accordance with an embodiment of the present invention. It will be understood that one or more portions of the process flow 400 illustrated in FIG. 4 may represent one or more additional or alternative portions of the process flow 100 described in connection with FIG. 1. In accordance with some embodiments, one or more portions of the process flow 400 are performed by an apparatus having hardware and/or software configured to perform one or more portions of the process flow 400. In such embodiments, the apparatus having the process flow 400 is configured to receive a transaction history associated with an account, as represented by block 410. As represented by block 420, the apparatus is also configured to determine a trend based at least partially on the transaction history. Additionally, as represented by block 430, the apparatus is further configured to prompt a holder of the account to submit one or more payments for offsetting one or more future account discrepancy assessments, where the apparatus prompting the holder is based at least partially on the trend.

Regarding block 410, the phrase "transaction history," as used herein, typically refers to any of the information associated with any one or more individual transactions in which an account has been involved, such as, for example, the description of the goods/services involved in the transaction, the transaction date, the posting date, the type of transaction (e.g., purchase, deposit, credit, debit, draw, etc.), the transaction amount, the names of the merchants and/or counterparties involved in the transaction, the locations of the merchants and/or counterparties involved in the transaction, and/or any other transaction information. It will be understood that the transaction history contemplated herein includes the information typically provided to the account holder in a periodic (e.g., monthly) account statement and/or via an electronic banking account (e.g., online banking account, mobile banking account, etc.). Transaction history information may also include any information associated with one or more account discrepancy transactions and/or account discrepancy assessments.

Regarding block 420, the term "trend," as used herein, typically refers to one or more earning, spending, credit, debit, and/or other behaviors, tendencies, and/or patterns evidenced by the transaction history. For example, in some embodiments, the apparatus having the process flow 400 is configured to determine that the account has incurred two or more account discrepancy assessments each month for the previous three months. Based at least partially on this information, the apparatus may determine that this is a trend associated with the account. In such embodiments, the apparatus may be further configured to prompt the account holder to submit as many payments as necessary to offset at least two account discrepancy assessments each month.

In some embodiments, the apparatus having the process flow 400 is configured to determine a trend based at least partially on information associated with two or more transactions described in the transaction history. However, in other embodiments, the apparatus is configured to determine a trend based only on one transaction from the transaction history. For example, in some embodiments, the apparatus having the process flow 400 is configured to prompt the holder based solely on the amount and timing of a single account discrepancy assessment incurred during a previous month. In some embodiments, the apparatus having the process flow 400 is configured to determine the trend as a result of implementing an algorithm to analyze the transaction history. Additionally or alternatively, in some embodiments, the apparatus is configured to determine the trend by projecting one or more funding shortfalls based at least partially on the transaction history.

Regarding block 430, the apparatus having the process flow 400 can be configured to prompt the holder via any communication device and/or medium, such as, for example, a personal computer, mobile phone, ATM, online banking account, email account, social media network, and/or the like. In some embodiments, the prompting the holder includes sending and/or presenting one or more questions, instructions, requests, messages, graphics, sounds, telephone calls, emails, text messages, SMS messages (e.g., traditional SMS messages, 2-way SMS messages, etc.), actionable alerts, instant messages, voice messages, voice recordings, interactive voice response (IVR) communications, pages, emails, communications specific to one or more social media networks and/or applications, and/or the like. For example, in some embodiments, the apparatus having the process flow 400 sends a text message to the account holder's mobile phone that notifies the holder of the trend and/or prompts the holder to submit one or more payments (e.g., using the mobile phone and/or a mobile banking application, etc.) in response. As another example, in some embodiments, the apparatus sends a web page to a personal computer that can be rendered at the personal computer to display an input feature (e.g., digital selectable button, link, drop down menu, etc.) that invites the holder to use the input feature to submit the one or more payments.

In some embodiments, the holder requests the prompting, but in other embodiments, the holder receives an unsolicited prompt. In other words, the prompting may include one or more "push" and/or "pull" communications delivered to the holder via a transaction machine (e.g., the prepayment machine 620, etc.). Also, in some embodiments, the apparatus having the process flow 400 is configured to communicate with the holder, via the transaction machine, by using pre-recorded and/or dynamically generated video and/or audio (e.g., which may include one or more menu options, etc.) in order to further communicate with the holder and/or direct the holder how to proceed. In addition to prompting, in some embodiments, the apparatus is also configured to present to the holder information that identifies the amount of an account discrepancy assessment, the payment amount required to offset a future account discrepancy assessment, the available balance and/or available credit for the account, and/or the like. It will be understood that the information associated with the account discrepancy assessment may be presented to the holder at the same time as the apparatus prompts the holder to submit the one or more payments.

Referring now to FIG. 5, a process flow 500 is provided for prompting an account holder to increase an account discrepancy allocation based at least partially on a predetermined threshold, in accordance with an embodiment of the present invention. It will be understood that one or more portions of the process flow 500 illustrated in FIG. 5 may represent one or more additional or alternative portions of the process flow 200 described in connection with FIG. 2. In accordance with some embodiments, one or more portions of the process flow 500 are performed by an apparatus having hardware and/or software configured to perform one or more portions of the process flow 500. In such embodiments, the apparatus having the process flow 500 is configured to receive information associated with an account discrepancy allocation, where the account discrepancy allocation is associated with an account, as represented by block 510. As represented by block 520, the apparatus is also configured to determine that the account discrepancy allocation has fallen below a predetermined threshold. In addition, as represented by block 530, the apparatus is configured to prompt a holder of the account to increase the account discrepancy allocation based at least partially on the apparatus determining that the account discrepancy allocation has fallen below the predetermined threshold. In some embodiments, the predetermined threshold may be defined as an amount (e.g., an amount of funds in the account discrepancy allocation, etc.) and/or as a number of account discrepancy assessment credits. In some embodiments, the apparatus having the process flow 500 is configured to enable the holder of the account to select (e.g., via a mobile device, via user interface, etc.) the predetermined threshold before the apparatus executes the process flow 500.

Referring now to FIG. 6, a system 600 is provided for offsetting future account discrepancy assessments, in accordance with an embodiment of the present invention. As illustrated, the system 600 includes a network 610, a prepayment machine 620, and an authorization apparatus 630. The system 600 also includes a personal computer 601, a banking center 602, a POS device 603, an ATM 604, a mobile phone 605, and a call center 606, which are sometimes collectively referred to herein as "the channels 601-606" for simplicity. FIG. 6 also shows an account holder 608 and an account 640. The account 640 (e.g., credit account, deposit account, etc.) is associated with an account discrepancy allocation 642 and coverage 644. As shown, the holder 608 has access to the prepayment machine 620 and the channels 601-606. In accordance with some embodiments, the prepayment machine 620 and the authorization apparatus 630 are each maintained by the same financial institution. For example, in some embodiments, the holder 608 is a customer of the financial institution, the authorization apparatus 630 is embodied as an ATM transaction server maintained by the financial institution, and the prepayment machine 620 is embodied as an ATM maintained by the financial institution. However, in other embodiments, the prepayment machine 620 and the authorization apparatus 630 are maintained by separate entities. For example, in some embodiments, the prepayment machine 620 is embodied as a personal computer maintained by the account holder 608, and the authorization apparatus 630 is embodied as an authorization server maintained by a financial institution. In accordance with some embodiments, the prepayment machine 620 is associated with the holder 608 and/or is carried, owned, possessed, and/or owned by the holder 608.

As shown in FIG. 6, the prepayment machine 620, the authorization apparatus 630, and the channels 601-606 are each operatively and selectively connected to the network 610, which may include one or more separate networks. In addition, the network 610 may include one or more interbank networks, telephone networks, telecommunication networks, cellular networks, NFC networks, local area networks (LANs), wide area networks (WANs), and/or global area networks (GANs) (e.g., the Internet, etc.). It will also be understood that the network 610 may be secure and/or unsecure and may also include wireless and/or wireline technology.

The prepayment machine 620 can include any apparatus described and/or contemplated herein. In addition, the prepayment machine 620 can initiate, execute, complete, and/or otherwise facilitate any one or more portions of any embodiment described and/or contemplated herein. In some embodiments, the prepayment machine 620 includes one or more personal computers, ATMs, POS devices, gaming devices, mobile phones, modules, front end systems, network devices, and/or the like. Thus, it will be understood that, in some embodiments, the prepayment machine 620 is the same type of machine as the personal computer 601, the POS device 603, and/or the ATM 604. (In some alternative embodiments, the prepayment machine 620 is the personal computer 601, the POS device 603, and/or the ATM 604.) As illustrated in FIG. 6, the prepayment machine 620 includes a communication interface 622, a processor 624, and a memory 626 having a prepayment application 627 stored therein. As shown, the processor 624 is operatively connected to the communication interface 622 and the memory 626.

Each communication interface described herein, including the communication interface 622, generally includes hardware, and, in some instances, software, that enables a portion of the system 600, such as the prepayment machine 620, to send, receive, and/or otherwise communicate information to and/or from the communication interface of one or more other portions of the system 600. For example, the communication interface 622 of the prepayment machine 620 may include a modem, network interface controller (NIC), near field communication (NFC) interface, network adapter, network interface card, and/or some other electronic communication device that operatively connects the prepayment machine 620 to another portion of the system 600, such as, for example, the authorization apparatus 630.

Each processor described herein, including the processor 624, generally includes circuitry for implementing the audio, visual, and/or logic functions of that portion of the system 600. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the prepayment application 627 of the memory 626 of the prepayment machine 620.

Each memory device described herein, including the memory 626 for storing the prepayment application 627 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus. The memory may be transitory and/or non-transitory.

As shown in FIG. 6, the memory 626 includes the prepayment application 627. The prepayment application 627 may instruct and/or cause the processor 624 (and/or the prepayment machine 620) to execute any one or more of the functions described herein as being performed by "an apparatus," by the prepayment machine 620, and/or by the prepayment application 627. Additionally or alternatively, the prepayment application 627 can be executable to initiate, execute, complete, and/or otherwise facilitate any one or more portions of any embodiment described and/or contemplated herein, such as, for example, any one or more portions of the process flows 100, 200, 300, 400, and/or 500 described herein.

For example, in some embodiments, the prepayment application 627 is executable to receive one or more payments for offsetting one or more future account discrepancy assessments. As another example, in some embodiments, the prepayment application 627 is executable to receive transaction information associated with a transaction. As another example, in some embodiments, the prepayment application 627 is executable to increase and/or decrease an account discrepancy allocation (e.g., the account discrepancy allocation 642) associated with an account. As still another example, in some embodiments, the prepayment application 627 is executable to prompt a user (e.g., the holder 608) to consent to an account discrepancy assessment and/or an account discrepancy. As another example, in some embodiments, the prepayment application 627 is executable to prompt the account holder 608 to consent to an account discrepancy, to an account discrepancy assessment, and/or to using the account discrepancy allocation 642 and/or the coverage 644 to offset an account discrepancy assessment associated with an account discrepancy transaction. As another example, in some embodiments, the prepayment application 627 is executable to receive one or more premium payments for purchasing coverage (e.g., the coverage 644) to offset one or more future account discrepancy assessments. As another example, in some embodiments, the prepayment application 627 is executable to record coverage information in a computer-readable medium, where the coverage information indicates that the account has coverage to offset one or more future account discrepancy assessments.

As another example, in some embodiments, the prepayment application 627 is executable to determine a trend based at least partially on a transaction history associated with an account (e.g., the account 640). As another example, in some embodiments, the prepayment application 627 is executable to prompt a holder of an account to submit one or more payments for offsetting one or more future account discrepancy assessments. As a further example, in some embodiments, the prepayment application 627 is executable to determine that an account discrepancy allocation has fallen below a predetermined threshold. As another example, in some embodiments, the prepayment application 627 is executable to prompt a holder to increase an account discrepancy allocation.

In some embodiments, where the prepayment machine 620 includes and/or is embodied as an ATM, the prepayment application 627 is configured to execute on the ATM in order to initiate, perform, complete, and/or facilitate, for example, one or more cash withdrawals, deposits, and/or the like. In other embodiments, where the prepayment machine 620 includes and/or is embodied as a POS device, the prepayment application 627 is configured to execute on the POS device in order to initiate, perform, complete, and/or facilitate, for example, one or more debit card and/or credit card transactions. In still other embodiments, where the prepayment machine 620 includes and/or is embodied as a personal computer, the prepayment application 627 is configured to execute on the personal computer, and, in some embodiments, the prepayment application 627 is embodied as a web browser (i.e., for navigating the Internet, etc.) that is operable to initiate, perform, complete, and/or otherwise facilitate one or more transactions (e.g., submitting payments for offsetting future account discrepancy assessments).

In some embodiments, the prepayment application 627 is executable to enable the holder 608 and/or prepayment machine 620 to communicate with one or more other portions of the system 600, and/or vice versa. In some embodiments, the prepayment application 627 is additionally or alternatively executable to initiate, perform, complete, and/or otherwise facilitate one or more financial and/or non-financial transactions. In some embodiments, the prepayment application 627 includes one or more computer-executable program code portions for causing and/or instructing the processor 624 to perform one or more of the functions of the prepayment application 627 and/or prepayment machine 620 described and/or contemplated herein. In some embodiments, the prepayment application 627 includes and/or uses one or more network and/or system communication protocols.

In some embodiments, the prepayment machine 620 and/or prepayment application 627 (and/or one or more other portions of the system 600) requires its users to authenticate themselves to the prepayment machine 620 and/or prepayment application 627 before the prepayment machine 620 and/or prepayment application 627 will perform one or more functions. For example, in some embodiments, the prepayment machine 620 (and/or the prepayment application 627) is configured to authenticate a user based at least partially on an ATM/debit/credit card, loyalty/rewards/club card, smart card, token (e.g., USB token, etc.), username/password, personal identification number (PIN), biometric information, and/or one or more other credentials that the user presents to the prepayment application 627. Additionally or alternatively, in some embodiments, the prepayment application 627 is configured to authenticate a user by using one-, two-, or multi-factor authentication. For example, in some embodiments, the prepayment application 627 requires two-factor authentication, such that the holder 608 must provide a valid debit card and enter the correct PIN associated with the debit card in order to authenticate the holder 608 to the prepayment application 627.

As shown in FIG. 6, the prepayment machine 620 also includes the user interface 629. It will be understood that the user interface 629 (and any other user interface described and/or contemplated herein) can include one or more user interfaces. It will also be understood that, in some embodiments, the user interface 629 includes one or more user output devices for presenting information and/or one or more items to the prepayment machine user (e.g., the holder 608), such as, for example, one or more displays, speakers, receipt printers, dispensers (e.g., cash dispensers, ticket dispensers, merchandise dispensers, etc.), and/or the like. In some embodiments, the user interface 629 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, scanners, biometric readers, motion detectors, cameras, card readers (e.g., for reading the magnetic strip on magnetic cards such as ATM, debit, credit, and/or bank cards, etc.), deposit mechanisms (e.g., for depositing checks and/or cash, etc.), and/or the like for receiving information from one or more items and/or from the transaction machine user. In some embodiments, the user interface 629 and/or the prepayment machine 620 includes one or more vaults, sensors, locks, and/or anything else typically included in, on, and/or near a prepayment machine.

FIG. 6 also shows an authorization apparatus 630, which may include any apparatus described and/or contemplated herein. In addition, the authorization apparatus 630 can initiate, execute, complete, and/or otherwise facilitate any one or more portions of any embodiment described and/or contemplated herein. In some embodiments, the authorization apparatus 630 includes one or more servers, engines, modules, mainframe computers, personal computers, ATMs, front end systems, back end systems, network devices, and/or the like. As illustrated in FIG. 6, the authorization apparatus 630 includes a communication interface 632, a processor 634, and a memory 636, which includes an authorization application 637 and an authorization datastore 638 stored therein. As shown, the communication interface 632 is operatively connected to the processor 634, which is operatively connected to the memory 636.

The authorization application 637 may instruct and/or cause the processor 634 (and/or the authorization apparatus 630) to execute any one or more of the functions described herein as being performed by "an apparatus," by the authorization apparatus 630, and/or by the authorization application 637. The authorization application 637 can be executable to initiate, execute, complete, and/or facilitate any one or more portions of any embodiment described and/or contemplated herein, such as, for example, any one or more portions of the process flows 100, 200, 300, 400, and/or 500 described herein.

For example, in some embodiments, the authorization application 637 is executable to receive one or more payments for offsetting one or more future account discrepancy assessments. As another example, in some embodiments, the authorization application 637 is executable to receive transaction information associated with a transaction. As another example, in some embodiments, the authorization application 637 is executable to determine that an account will incur an account discrepancy as a result of a transaction (i.e., make an account discrepancy determination). As still another example, in some embodiments, the authorization application 637 is executable to determine that an account discrepancy allocation, account discrepancy assessment credit, coverage, and/or one or more payments are sufficient to offset an account discrepancy assessment associated with an account discrepancy transaction (i.e., make a sufficiency determination). As another example, in some embodiments, the authorization application 637 is executable to prompt the account holder 608 to consent to an account discrepancy, to an account discrepancy assessment, and/or to using the account discrepancy allocation 642 and/or the coverage 644 to offset an account discrepancy assessment associated with an account discrepancy transaction. As another example, in some embodiments, the authorization application 637 is executable to authorize a transaction.

In some embodiments, the authorization application 637 is executable to receive, approve, and/or decline an authorization request. As another example, in some embodiments, the authorization application 637 is executable to determine whether an account and/or an account holder is enrolled in an account discrepancy service. As still another example, in some embodiments, the authorization application 637 is executable to prompt a customer to consent (e.g., via the user interface 629, etc.) to an account discrepancy assessment. In some embodiments, the authorization application 637 is executable to increase and/or decrease an account discrepancy allocation associated with an account. As another example, in some embodiments, the authorization application 637 is executable to complete a transaction.

In some embodiments, the authorization application 637 is executable to receive one or more premium payments for purchasing coverage to offset one or more future account discrepancy assessments. Also, in some embodiments, the authorization application 637 is executable to record coverage information in a computer-readable medium (e.g., the authorization datastore 638, etc.), where the coverage information indicates that the account has coverage to offset one or more future account discrepancy assessments. As another example, in some embodiments, the authorization application 637 is executable to determine that an account has coverage sufficient to offset an account discrepancy assessment.

In some embodiments, the authorization application 637 is executable to receive transaction history associated with an account and/or determine a trend based at least partially on that transaction history. As another example, in some embodiments, the authorization application 637 is executable to prompt a holder to submit one or more payments for offsetting one or more future account discrepancy assessments. As still another example, in some embodiments, the authorization application 637 is executable to determine that an account discrepancy allocation has fallen below a predetermined threshold. In some embodiments, the authorization application 637 is executable to prompt a holder of an account to increase an account discrepancy allocation. Also, in some embodiments, the authorization application 637 is executable to determine that an account discrepancy assessment is associated with an account.

In some embodiments, the authorization application 637 is executable to generate and/or send disclosure information to the holder 608, where the disclosure information defines one or more terms of an account discrepancy service. In some embodiments, the authorization application 637 generates and/or sends this disclosure information to the holder 608 prior to the holder 608 submitting a payment at the prepayment machine 620 and/or prior to the holder 608 initiating and/or engaging in a transaction at one or more of the channels 601-606. Also, in some embodiments, the authorization application 637 is further executable to prompt (e.g., via the user interface 629, a user interface of one of the channels 601-606, etc.) the holder 608 to agree to the one or more terms of the account discrepancy service defined in the disclosure information. In some embodiments, the authorization application 637 is operable to perform one or more of these (and/or other) functions, such that a financial institution may comply with one or more account discrepancy regulation requirements (e.g., Regulation E in the United States, etc.).

In some embodiments, the authorization application 637 is executable to enable the authorization apparatus 630 to communicate with one or more other portions of the system 600, such as, for example, the authorization datastore 638 and/or the prepayment machine 620, and/or vice versa. In addition, in some embodiments, the authorization application 637 is executable to initiate, perform, complete, and/or otherwise facilitate one or more financial and/or non-financial transactions. In some embodiments, the authorization application 637 includes one or more computer-executable program code portions for causing and/or instructing the processor 634 to perform one or more of the functions of the authorization application 637 and/or the authorization apparatus 630 that are described and/or contemplated herein. In some embodiments, the authorization application 637 includes and/or uses one or more network and/or system communication protocols.

In addition to the authorization application 637, the memory 636 also includes the authorization datastore 638. It will be understood that the authorization datastore 638 can be configured to store any type and/or amount of information. For example, in some embodiments, the authorization datastore 638 includes information associated with one or more accounts, account holders, transactions, account discrepancies, account discrepancy assessments, account discrepancy allocations, coverages, electronic banking accounts, account discrepancy services, authorization requests, account discrepancy regulations, and/or the like. In some embodiments, the authorization datastore 638 may also store any information related to offsetting future account discrepancy assessments via a prepayment machine (e.g., the prepayment machine 620). In some embodiments, the authorization datastore 638 additionally or alternatively stores information associated with electronic banking and/or electronic banking accounts.

In accordance with some embodiments, the authorization datastore 638 may include any one or more storage devices, including, but not limited to, datastores, databases, and/or any of the other storage devices typically associated with a computer system. It will also be understood that the authorization datastore 638 may store information in any known way, such as, for example, by using one or more computer codes and/or languages, alphanumeric character strings, data sets, figures, tables, charts, links, documents, and/or the like. Further, in some embodiments, the authorization datastore 638 includes information associated with one or more applications, such as, for example, the authorization application 637 and/or the prepayment application 627. In some embodiments, the authorization datastore 638 provides a real-time or near real-time representation of the information stored therein, so that, for example, when the processor 634 accesses the authorization datastore 638, the information stored therein is current or nearly current.

The embodiment represented by FIG. 6 is exemplary and other embodiments may vary. For example, in some embodiments, some or all of the portions of the system 600 are combined into a single portion. Specifically, in some embodiments, the prepayment machine 620 and the authorization apparatus 630 are combined into a single prepayment and authorization apparatus that is configured to perform all of the same functions of those separate portions as described and/or contemplated herein. In some alternative embodiments, the prepayment machine 620 is the ATM 604. For example, in some embodiments, the holder 608 uses the ATM 604 to prepay a future account discrepancy assessment and then later initiates a transaction at the ATM 604 that results in an account discrepancy. In some embodiments, some or all of the portions of the system 600 are separated into two or more distinct portions. In addition, the various portions of the system 600 may be maintained by the same or separate parties.

The system 600 and/or one or more portions of the system 600 may include and/or implement any embodiment of the present invention described and/or contemplated herein. For example, in some embodiments, the system 600 (and/or one or more portions of the system 600) is configured to implement any one or more embodiments of the process flow 100 described and/or contemplated herein in connection with FIG. 1, any one or more embodiments of the process flow 200 described and/or contemplated herein in connection with FIG. 2, any one or more embodiments of the process flow 300 described and/or contemplated herein in connection with FIG. 3, any one or more embodiments of the process flow 400 described and/or contemplated herein in connection with FIG. 4, any one or more embodiments of the process flow 500 described and/or contemplated herein in connection with FIG. 5, and/or any one or more embodiments of the process flow described and/or contemplated herein in connection with FIG. 7.

As a specific example, in accordance with an embodiment of the present invention, the authorization apparatus 630 is configured to: (a) receive one or more payments for offsetting one or more future account discrepancy assessments, where the one or more payments are associated with the account 640 (e.g., and/or received via the prepayment machine 620, etc.), as represented by block 110 shown in FIG. 1; (b) receive transaction information associated with a transaction (e.g., via the ATM 604), where the transaction involves the account 640 (and/or the account holder 608 and/or, e.g., the ATM 604, etc.), and where the transaction is initiated after the receiving the one or more payments, as represented by block 120; (c) determine, based at least partially on the transaction information, that the account 640 will incur an account discrepancy as a result of the transaction, as represented by block 130; (d) determine that the one or more payments (and/or the account discrepancy allocation 642 and/or the coverage 644) are sufficient offset an account discrepancy assessment associated with the account discrepancy, as represented by block 140; (e) authorize the transaction based at least partially on the authorization apparatus 630 determining that the one or more payments (and/or the account discrepancy allocation 642 and/or coverage 644) are sufficient, as represented by block 150. In accordance with some embodiments, the prepayment machine 620, the authorization apparatus 630, and the channels 601-606 are each configured to send and/or receive one or more instructions to and/or from each other, such that an instruction sent, for example, from the authorization apparatus 630 to the prepayment machine 620 (and/or vice versa) can trigger the prepayment machine 620 (and/or vice versa) to perform one or more portions of any one or more of the embodiments described and/or contemplated herein.

Referring now to FIG. 7, a mixed block and flow diagram of a system 700 for prepaying a future deposit account discrepancy assessment is provided, in accordance with an exemplary embodiment of the present invention. It will be understood that the system 700 illustrated in FIG. 7 represents an example embodiment of the process flow 100 described in connection with FIG. 1 and/or the system 600 described in connection with FIG. 6. As shown, the system 700 includes a personal computer 701 (e.g., the prepayment machine 620, etc.), an authorization server 703 (e.g., the authorization apparatus 630, etc.), and a POS device 705 (e.g., the POS device 603, etc.). The personal computer 701, the authorization server 703, and the POS device 705 may each include a communication interface, a user interface, a processor, a memory, an application, and/or a datastore, and those devices may be operatively connected to each other.

In accordance with some embodiments, the personal computer 701 and the POS device 705 are operatively and selectively connected to the authorization server 703 via one or more networks (not shown). Also, the personal computer 701 and the POS device 705 are accessible to a customer of a bank (not shown). Also, in this example embodiment, the POS device 705 is maintained by a merchant, the personal computer 701 is maintained by the customer of the bank, and the authorization server 703 is maintained by the bank. Further, in accordance with some embodiments, the bank maintains the checking account (e.g., the account 640, etc.) held by the customer and associated with the debit card mentioned below. Also, it will be understood that, in this example embodiment, the checking account (and/or the customer) includes an deposit account discrepancy allocation (e.g., account discrepancy allocation 642, etc.).

As represented by block 702, the customer logs in to an online banking account associated with the checking account. Although not shown, in some embodiments, the customer may be identified and/or authenticated as part of the login process. Next, as represented by block 704, the customer submits a $50 payment for prepaying a future deposit account discrepancy assessment. For example, in some embodiments, the customer uses one or more user input features (e.g., field, button, drop down menu, etc.) of the online banking account to send a payment of $50 to the authorization server 703 (and/or one or more other bank apparatuses) for the purpose of prepaying one or more future deposit account discrepancy assessments that may incurred by the checking account and/or the customer. As a result of submitting the $50 payment, the authorization server 703 increases the customer's deposit account discrepancy allocation by $100, as represented by block 706. Thus, in this example embodiment, the authorization server 703 credits the customer's deposit account discrepancy allocation with an amount greater than the amount of the payment received. In other words, in this example embodiment, the customer is incentivized to submit a payment for prepaying one or more future deposit account discrepancy assessments because the customer receives double credit for each payment (and/or a discount by prepaying). Also, in this example embodiment, it will be understood that the $50 payment referred to in block 704 increases the customer's deposit account discrepancy allocation from $0 to $100.

After the bank customer submits the $50 payment (and/or the customer's deposit account discrepancy allocation is increased from $0 to $100 as a result of the payment), the customer swipes a debit card at the POS device 705 to engage in (and/or initiate) a debit card transaction (e.g., purchase transaction, etc.) involving the customer and the merchant, as represented by block 708. It will be understood that the customer swipes the debit card at the POS device 705 after the customer submits the $50 payment. For example, in some embodiments, the customer swipes the debit card at the POS device 705 minutes after the customer submits the $50 payment. Specifically, the customer may submit the $50 payment via the customer's mobile phone while the customer is waiting in line to approach to POS device 705 in the merchant store. As another example, in some embodiments, the customer swipes the debit card two months after the customer submits the $50 payment. Although not shown, the POS device 705 may also authenticate the customer based at least partially on one or more credentials the customer provides to the POS device 705.

Next, as represented by block 710, the POS device 705 generates and sends an authorization request associated with the debit card transaction to the authorization server 703. In accordance with some embodiments, the authorization request includes information that, for example, identifies the customer, the checking account associated with the debit card, the amount of the transaction, the one or more goods and/or services involved in the transaction, and/or the like. As represented by block 712, the authorization server 703 then determines that the checking account associated with the debit card will incur an deposit account discrepancy as a result of the transaction. After making the deposit account discrepancy determination, the authorization server 703, in this example embodiment, determines that a $35 deposit account discrepancy assessment is associated with the transaction (e.g., because the transaction is an deposit account discrepancy transaction, etc.), as represented by block 714.

In addition, in this example embodiment, as represented by block 716, the authorization server 705 determines that the customer is enrolled in (e.g., has already opted in to, etc.) an deposit account discrepancy service provided by the bank that maintains the checking account and the authorization server 703. Although not shown, in accordance with some embodiments, a customer is assigned an deposit account discrepancy allocation after the customer enrolls in the deposit account discrepancy service. Next, as represented by block 718, the authorization server 703 determines that the customer's deposit account discrepancy allocation is sufficient to pay the deposit account discrepancy assessment. For example, in some embodiments, the authorization server 703 determines that the $35 deposit account discrepancy assessment is less than the $100 amount in the customer's deposit account discrepancy allocation. Based at least partially on this sufficiency determination, the authorization server 703 approves the authorization request, as represented by block 720. After the authorization request has been approved and/or based at least partially on the authorization server 703 approving the authorization request, the transaction is completed at the POS device 705, as represented by block 722. Additionally, after the authorization request has been approved and/or based at least partially on the authorization server 703 approving the authorization request, the authorization server 703 decreases the customer's deposit account discrepancy allocation by $35 to pay the $35 deposit account discrepancy assessment, as represented by block 724. In this example embodiment, this results in the deposit account discrepancy allocation being adjusted from $100 before the decrease to $65 after the decrease. Also, it will be understood that, in accordance with some embodiments, the authorization server 703 decreasing the deposit account discrepancy allocation by $35 serves to pay the $35 deposit account discrepancy assessment.

Of course, the embodiment illustrated in FIG. 7 is merely exemplary and other embodiments may vary without departing from the scope and spirit of the present invention. For example, in some alternative embodiments, the authorization server 703 is configured to decrease the customer's deposit account discrepancy allocation, as represented by block 724, before and/or at the same time as the authorization server 703 approves the authorization request, as represented by block 720. As another example, in some alternative embodiments, the customer's $50 payment may only increase the customer's deposit account discrepancy allocation by $50 (i.e., the customer receives a dollar-for-dollar credit for the payment submitted). As still another example, in some alternative embodiments of the present invention, instead of involving a debit card, checking account, debit card transaction, and/or deposit account discrepancy service, the process flow shown in FIG. 7 involves a credit card, credit card account, credit card transaction, and/or credit account discrepancy service.

As still another example, in some alternative embodiments, the authorization server 703 is configured to perform one or more of the portions represented by blocks 712-718 after the authorization server approves the authorization request, as represented by block 720. For example, in some embodiments, after the authorization server 703 receives the $50 payment, increases the customer's deposit account discrepancy allocation by $100, and/or approves the authorization request, the authorization server 703 is configured to: (a) determine that the checking account has incurred the deposit account discrepancy assessment as a result of the transaction; and/or (b) decrease the deposit account discrepancy allocation based at least partially on the authorization server 703 determining that the account has incurred the deposit account discrepancy assessment. Thus, in such alternative embodiments, the authorization server 703 is configured to make the deposit account discrepancy determination and/or decrease the customer's deposit account discrepancy allocation after the authorization server 703 approves the authorization request and/or after the transaction occurs.

Also, in some embodiments, one or more of the portions of the process flow represented by blocks 702-724 are triggered by one or more triggering events, which, in some embodiments, include the performance of one or more of the other portions of the process flow represented by blocks 702-724. Also, in some embodiments, the system 700 is configured to perform the one or more portions of the process flow represented by blocks 702-724, from start to finish, within moments, seconds, and/or minutes. For example, in some embodiments, the authorization server 703 approves the authorization request within approximately moments, seconds, and/or minutes of the authorization server 703 receiving the authorization request from the POS device 705. Further, it will be understood that one or more portions of the process flow represented by blocks 702-724 may be configured to comply with one or more requirements of an account discrepancy regulation (e.g., Regulation E and/or the CARD Act in the United States).

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
receiving, via a computer processing device, one or more payments for offsetting one or more future account discrepancy assessments, wherein the one or more payments are associated with an account;
increasing, using a computer processing device, an account discrepancy allocation associated with the account based at least partially on receiving the one or more payments;
receiving, via a computer processing device, transaction information associated with a transaction, wherein the transaction involves the account, and wherein the transaction is initiated after receiving the one or more payments;
determining, using a computer processing device, based at least partially on the transaction information, that the account will incur an account discrepancy as a result of the transaction, wherein incurring an account discrepancy as a result of the transaction comprises the transaction being associated with a transaction amount that exceeds the available funds of the account;
determining, using a computer processing device, that the one or more payments are sufficient to offset an account discrepancy assessment associated with the account discrepancy wherein determining that the one or more payments are sufficient comprises determining that the account discrepancy allocation is sufficient to offset the account discrepancy assessment;
authorizing, using a computer processing device, the transaction based at least partially on the determining that the one or more payments are sufficient wherein authorizing the transaction comprises authorizing the transaction based at least partially on the determining that the account discrepancy allocation is sufficient; and
decreasing, using a computer processing device, the account discrepancy allocation based at least partially on the authorizing the transaction.

2. The method of claim 1, wherein determining that the account discrepancy allocation is sufficient to offset the account discrepancy assessment comprises determining that the amount of the account discrepancy assessment is less than the amount of the account discrepancy allocation.

3. The method of claim 1, wherein the account discrepancy allocation comprises a balance, wherein the increasing the account discrepancy allocation comprises increasing the balance by at least the amount of the one or more payments, and wherein the decreasing the account discrepancy allocation comprises decreasing the balance by the amount of the account discrepancy assessment.

4. The method of claim 1, wherein the account discrepancy allocation comprises a number of account discrepancy assessment credits, wherein the increasing the account discrepancy allocation comprises increasing the number of account discrepancy assessment credits, and wherein the decreasing the account discrepancy allocation comprises decreasing the number of account discrepancy assessment credits.

5. The method of claim 1, wherein the account discrepancy allocation comprises a number of account discrepancy assessment credits, and wherein the determining that the account discrepancy allocation is sufficient to offset the account discrepancy assessment comprises determining that the account discrepancy allocation comprises at least one account discrepancy assessment credit.

6. The method of claim 1, further comprising:
   determining that the account discrepancy allocation has fallen below a predetermined threshold; and
   prompting a holder of the account to increase the account discrepancy allocation based at least partially on the determining that the account discrepancy allocation has fallen below the predetermined threshold.

7. The method of claim 1, further comprising:
   receiving a transaction history associated with the account;
   determining a trend based at least partially on the transaction history; and
   prompting a holder of the account to submit one or more payments for offsetting one or more future account discrepancy assessments, wherein the prompting is based at least partially on the trend.

8. The method of claim 1, wherein the receiving the one or more payments comprises receiving, from a holder of the account, consent to the account being charged the one or more future account discrepancy assessments, and wherein the authorizing the transaction comprises authorizing the transaction based at least partially on the receiving the consent.

9. The method of claim 1, wherein the receiving the one or more payments for offsetting one or more future account discrepancy assessments comprises receiving one or more premium payments for purchasing coverage to offset one or more future account discrepancy assessments, the method further comprising:
   recording coverage information in a computer-readable medium based at least partially on the receiving the one or more premium payments, wherein the coverage information indicates that the account has coverage to offset one or more future account discrepancy assessments,
   wherein the determining that the one or more payments are sufficient comprises determining, based at least partially on the coverage information, that the account has coverage sufficient to offset the account discrepancy assessment, and
   wherein the authorizing the transaction comprises authorizing the transaction based at least partially on the determining that the account has coverage sufficient to offset the account discrepancy assessment.

10. The method of claim 9, wherein the coverage comprises a predetermined coverage amount for offsetting one or more future account discrepancy assessments, and wherein the determining that the account has coverage sufficient to offset the account discrepancy assessment comprises determining that the amount of the account discrepancy assessment is less than the predetermined coverage amount.

11. The method of claim 9, wherein the coverage comprises a predetermined coverage period for offsetting one or more future account discrepancy assessments, and wherein the determining that the account has coverage sufficient to offset the account discrepancy assessment comprises determining that the transaction occurs during the predetermined coverage period.

12. The method of claim 9, wherein the coverage is sufficient to offset a predetermined number of future account discrepancy assessments, and wherein the determining that the account has coverage sufficient to offset the account discrepancy assessment comprises determining that the account discrepancy assessment is within the predetermined number.

13. The method of claim 1, wherein the receiving one or more payments for offsetting one or more future account discrepancy assessments comprises receiving one or more payments for avoiding one or more future account discrepancy assessments,
   wherein the determining that the one or more payments are sufficient to offset the account discrepancy assessment comprises determining that the one or more payments are sufficient to avoid the account discrepancy assessment, and
   wherein the authorizing the transaction comprises authorizing the transaction based at least partially on the determining that the one or more payments are sufficient to avoid the account discrepancy assessment.

14. The method of claim 1, wherein the receiving one or more payments for offsetting one or more future account discrepancy assessments comprises receiving one or more payments for prepaying one or more future account discrepancy assessments,
   wherein the determining that the one or more payments are sufficient to offset the account discrepancy assessment comprises determining that the one or more payments are sufficient to pay the account discrepancy assessment, and
   wherein the authorizing the transaction comprises authorizing the transaction based at least partially on the determining that the one or more payments are sufficient to pay the account discrepancy assessment.

15. The method of claim 1, wherein the receiving the one or more payments comprises receiving the one or more payments from a first transaction machine, wherein the transaction involves a second transaction machine, and wherein the second transaction machine is different than the first transaction machine and located remotely from the first transaction machine.

16. The method of claim 1, wherein the transaction is initiated at least one hour after the receiving the one or more payments.

17. The method of claim 1, wherein the transaction involves a holder of the account, the method further comprising:
   prompting the holder to consent to using the one or more payments to offset the account discrepancy assessment, wherein the prompting occurs after the determining that the account will incur the account discrepancy and before the authorizing the transaction.

18. An apparatus comprising:
   a non-transitory computer-readable medium comprising a communication interface configured to:
   receive, via a computer processing device, one or more payments for offsetting one or more future account discrepancy assessments, wherein the one or more payments are associated with an account; and
   receive, via a computer processing device, transaction information associated with a transaction, wherein the transaction involves the account, and wherein the transaction is initiated after the communication interface receives the one or more payments; and
   a computing device processor operatively connected to the communication interface and configured to:
   increase an account discrepancy allocation associated with the account based at least partially on the receiving the one or more payments;
   determine, based at least partially on the transaction information, that the account will incur an account discrepancy as a result of the transaction, wherein incurring an account discrepancy as a result of the transaction comprises the transaction being associated with a transaction amount that exceeds the available funds of the account;
   determine that the one or more payments are sufficient to offset an account discrepancy assessment associated with the account discrepancy wherein the communication interface is further configured to determine that the account discrepancy allocation is sufficient to offset the account discrepancy assessment;

authorize the transaction based at least partially on the computing device processor determining that the one or more payments are sufficient wherein the communication interface is further configured to authorize the transaction based at least partially on the determining that the account discrepancy allocation is sufficient; and decrease the account discrepancy allocation based at least partially on authorizing the transaction.

19. The apparatus of claim 18, wherein the computing device processor is further configured to:

determine that the account discrepancy allocation has fallen below a predetermined threshold; and prompt a holder of the account to increase the account discrepancy allocation based at least partially on the computing device processor determining that the account discrepancy allocation has fallen below the predetermined threshold.

20. The apparatus of claim 18, wherein the communication interface is further configured to receive a transaction history associated with the account, and wherein the computing device processor is further configured to:

determine a trend based at least partially on the transaction history; and prompt a holder of the account to submit one or more payments for offsetting one or more future account discrepancy assessments based at least partially on the trend.

21. The apparatus of claim 18, wherein the one or more payments comprise one or more premium payments for purchasing coverage to offset one or more future account discrepancy assessments, and wherein the computing device processor is further configured to:

record coverage information in a computer-readable medium based at least partially on the communication interface receiving the one or more premium payments, wherein the coverage information indicates that the account has coverage to offset one or more future account discrepancy assessments, and wherein the computing device processor determining that the one or more payments are sufficient comprises the computing device processor determining, based at least partially on the coverage information, that the account has coverage sufficient to offset the account discrepancy assessment, and wherein the computing device processor authorizing the transaction comprises the computing device processor authorizing the transaction based at least partially on the computing device processor determining that the account has coverage sufficient to offset the account discrepancy assessment.

22. The apparatus of claim 18, wherein the transaction involves a holder of the account, and wherein the computing device processor is further configured to:

prompt the holder to consent to using the one or more payments to offset the account discrepancy assessment, wherein the computing device processor is configured to prompt the holder after the computing device processor determines that the account will incur the account discrepancy and before computing device processor authorizes the transaction.

23. A computer program product comprising a non-transitory computer-readable medium, wherein the non-transitory computer-readable medium comprises one or more computer-executable program code portions that, when executed by a computer, cause the computer to:

receive one or more payments for offsetting one or more future account discrepancy assessments, wherein the one or more payments are associated with an account;

increase an account discrepancy allocation associated with the account based at least partially on the computer receiving the one or more payments;

receive transaction information associated with a transaction, wherein the transaction involves the account, and wherein the transaction is initiated after the computer receives the one or more payments;

determine, based at least partially on the transaction information, that the account will incur an account discrepancy as a result of the transaction, wherein incurring an account discrepancy as a result of the transaction comprises the transaction being associated with a transaction amount that exceeds the available funds of the account;

determine that the one or more payments are sufficient to offset an account discrepancy assessment associated with the account discrepancy wherein the computer determining that the one or more payments are sufficient comprises the computer determining that the account discrepancy allocation is sufficient to offset the account discrepancy assessment;

authorize the transaction based at least partially on the computer determining that the one or more payments are sufficient wherein the computer authorizing the transaction comprises the computer authorizing the transaction based at least partially on the computer determining that the account discrepancy allocation is sufficient; and decrease the account discrepancy allocation based at least partially on the computer authorizing the transaction.

24. The computer program product of claim 23, wherein the one or more computer-executable program code portions, when executed by the computer, cause the computer to:

determine that the account discrepancy allocation has fallen below a predetermined threshold; and prompt a holder of the account to increase the account discrepancy allocation based at least partially on the computer determining that the account discrepancy allocation has fallen below the predetermined threshold.

25. The computer program product of claim 23, wherein the one or more computer-executable program code portions, when executed by the computer, cause the computer to:

receive a transaction history associated with the account;

determine a trend based at least partially on the transaction history; and prompt a holder of the account to submit one or more payments for offsetting one or more future account discrepancy assessments, wherein the computer prompting the holder is based at least partially on the trend.

26. The computer program product of claim 23, wherein the one or more payments comprise one or more premium payments for purchasing coverage to offset one or more future account discrepancy assessments, and wherein the one or more computer-executable program code portions, when executed by the computer, cause the computer to:

record coverage information in a computer-readable medium based at least partially on the computer receiving the one or more premium payments, wherein the coverage information indicates that the account has coverage to offset one or more future account discrepancy assessments, and wherein the computer determining that the one or more payments are sufficient comprises the computer determining, based at least partially on the coverage information, that the account has coverage sufficient to offset the account discrepancy assessment, and wherein the computer authorizing the transaction comprises the computer authorizing the transaction based at least partially on the computer determining that the account has coverage sufficient to offset the account discrepancy assessment.

27. A method comprising:

receiving, via a computer processing device, a payment for prepaying a future account discrepancy assessment, wherein the payment is associated with an account;

receiving, via a computer processing device, an account discrepancy allocation associated with the account based at least partially on the receiving the payment;

determining, using a computer processing device, that the account has incurred an account discrepancy assessment as a result of a transaction, wherein the transaction was initiated after the receiving the payment, wherein incurring an account discrepancy comprises as a result of the transaction comprises the transaction being associated with a transaction amount that exceeds the available funds of the account; and decreasing, using a computer processing device, the account discrepancy allocation based at least partially on the determining that the account has incurred the account discrepancy assessment.

28. The method of claim 27, wherein the increasing the account discrepancy allocation comprises increasing the account discrepancy allocation by the amount of the payment.

29. The method of claim 27, wherein the decreasing the account discrepancy allocation comprises decreasing the account discrepancy allocation by the amount of the account discrepancy assessment.

30. The method of claim 27, wherein the decreasing the account discrepancy allocation comprises paying the account discrepancy assessment.

31. The method of claim 27, further comprising:

determining that the account discrepancy allocation has fallen below a predetermined threshold; and prompting a holder of the account to increase the account discrepancy allocation based at least partially on the determining that the account discrepancy allocation has fallen below the predetermined threshold.

32. The method of claim 27, further comprising:

receiving a transaction history associated with the account;

determining a trend based at least partially on the transaction history, wherein the trend is based at least partially on the number of account discrepancy assessments identified in the transaction history; and prompting a holder of the account to increase the account discrepancy assessment allocation based at least partially on the trend.

33. The method of claim 27, wherein the transaction is completed before the determining that the account has incurred an account discrepancy assessment as a result of the transaction.

34. The method of claim 27, wherein the transaction involves a holder of the account, the method further comprising:

prompting the holder to consent to using the account discrepancy allocation to offset the account discrepancy assessment, wherein the prompting the holder occurs during the transaction.

\* \* \* \* \*